(12) United States Patent
Ren et al.

(10) Patent No.: US 11,964,906 B2
(45) Date of Patent: Apr. 23, 2024

(54) RADIATION CURABLE COMPOSITIONS FOR COATING OPTICAL FIBER

(71) Applicant: Covestro (Netherlands) B.V., Nieuwegein (NL)

(72) Inventors: Kangtai Ren, Elgin, IL (US); Johan Franz Gradus Antonius Jansen, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 651 days.

(21) Appl. No.: 17/262,397

(22) PCT Filed: Aug. 27, 2019

(86) PCT No.: PCT/US2019/048245
§ 371 (c)(1),
(2) Date: Jan. 22, 2021

(87) PCT Pub. No.: WO2020/046865
PCT Pub. Date: Mar. 5, 2020

(65) Prior Publication Data
US 2021/0331969 A1    Oct. 28, 2021

Related U.S. Application Data

(60) Provisional application No. 62/724,738, filed on Aug. 30, 2018, provisional application No. 62/724,735, filed on Aug. 30, 2018, provisional application No. 62/724,729, filed on Aug. 30, 2018.

(51) Int. Cl.
| | |
|---|---|
| *C03C 25/1065* | (2018.01) |
| *C03C 13/04* | (2006.01) |
| *C03C 25/285* | (2018.01) |
| *C09D 4/00* | (2006.01) |
| *C09D 133/14* | (2006.01) |
| *C09D 175/14* | (2006.01) |

(52) U.S. Cl.
CPC .......... *C03C 25/1065* (2013.01); *C03C 13/04* (2013.01); *C03C 25/285* (2013.01); *C09D 4/00* (2013.01); *C09D 133/14* (2013.01); *C09D 175/14* (2013.01); *C03C 2213/00* (2013.01)

(58) Field of Classification Search
CPC ...... C04D 4/00; C04D 175/44; C04D 133/14; C09D 4/00; C09D 175/44; C09D 133/14
See application file for complete search history.

(56) References Cited

U.S. PATENT DOCUMENTS

| | | | |
|---|---|---|---|
| 7,010,206 B1 | 3/2006 | Baker | |
| 9,062,083 B2 | 6/2015 | Bishop | |
| 2004/0228594 A1 | 11/2004 | Andre | |
| 2008/0277814 A1 | 11/2008 | Moszner et al. | |
| 2012/0196122 A1 | 8/2012 | Bishop | |
| 2018/0163075 A1* | 6/2018 | Ren | .......... C08L 75/14 |

FOREIGN PATENT DOCUMENTS

| | | |
|---|---|---|
| EP | 2103297 | 9/2009 |
| WO | 2016028668 | 2/2016 |
| WO | 2017059222 A1 | 4/2017 |

OTHER PUBLICATIONS

International Search Report and Written Opinion dated Dec. 16, 2019.

* cited by examiner

*Primary Examiner* — Cynthia Szewczyk
(74) *Attorney, Agent, or Firm* — Donald R. Palladino

(57) ABSTRACT

Described herein are methods of producing a coated optical fiber from a primary and/or secondary coating composition that contain a reactive oligomer having an average of at least one polymerizable group, a monomer having an average of at least one polymerizable group, and a photoinitiator, wherein the photoinitiator possesses specified normalized rates of polymerization at (150) degrees Celsius and/or a potential excited triplet state with certain ionization potential values. Also described and claimed are the compositions for use therewith, including primary coating compositions and secondary coating compositions. Yet further described and claimed are the coated optical fibers produced from the methods and/or compositions elsewhere described.

20 Claims, 4 Drawing Sheets

RADIATION CURABLE COMPOSITIONS FOR COATING OPTICAL FIBER

CROSS-REFERENCE TO RELATED APPLICATIONS

This application is a U.S. national phase entry under 35 USC § 371 of international application, PCT/US2019/048245, filed 27 Aug. 2019, which claims priority to U.S. Provisional Application Nos. 62/724,729, filed 30 Aug. 2018, U.S. Provisional Application No. 62/724,735, fled 30 Aug. 2018, and U.S. Provisional Application No. 62/724,738, filed 30 Aug. 2018, which are hereby incorporated by reference in its entirety as if fully set forth herein.

TECHNICAL FIELD

The present invention relates to radiation curable compositions for coating optical fibers, methods of coating optical fibers under high draw speed, low helium processing conditions, and/or via LED light sources, and the optical fibers and cables produced therefrom.

BACKGROUND

Optical fibers have been used in a variety of applications and have several advantages over other media. For example, data can be transmitted over optical fibers at a higher data rate than over wires. Optical fibers are also lighter and more flexible than wires. Thus, optical fibers, especially those made from glass, are often used in the telecommunication industry for data transmission. However, if left unprotected, optical fibers are unsuitable for field use because of the fragility of the thin glass strand across which optical signals are transmitted. In addition to their susceptibility to physical damage, uncoated optical fibers would also be negatively impacted by moisture contact. As a result, surface coatings have long-since been applied to optical fibers for protection and to ensure a high-level of performance.

It is well known to draw glass fibers from a specially prepared, cylindrical preform which has been locally and symmetrically heated to a temperature of, e.g., about 2000 degrees Celsius (° C.). As the preform is heated, such as by feeding the preform into and through a furnace, a glass fiber is drawn from the molten material. The surface coating compositions are applied to the glass fiber after it has been drawn from the preform, preferably immediately after cooling. The coating compositions are then cured to produce the coated optical fiber. General methods of applying dual layers of coating compositions to a moving glass fiber are well-known in the art, and are disclosed in U.S. Pat. No. 4,474,830 to Taylor and U.S. Pat. No. 4,851,165 to Rennell et al. Newer fiber design concepts can be found in U.S. Pat. No. 8,837,892, US 2014/0294355, and US 2015/0071595.

To protect them, optical fibers are frequently coated with two or more superposed radiation-curable coatings immediately after the fiber is produced by drawing. The coating which directly contacts the optical fiber is called the "inner primary coating" and an overlaying coating is called the "outer primary coating." In some references, the inner primary coating is also called simply the "primary coating" and the outer primary coating is called a "secondary coating." Inner primary coatings are typically formulated to possess a significantly lower modulus than secondary coatings.

The relatively soft inner primary coating provides resistance to microbending which results in added attenuation of the signal transmission (i.e. signal loss) of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating thickness decreases the amount of protection provided decreases. The relationship between coatings and protection from lateral stress that leads to microbending is discussed, for example, in D. Gloge, "Optical-fiber packaging and its influence on fiber straightness and loss", *Bell System Technical Journal*, Vol. 54, 2, 245 (1975); W. B. Gardner, "Microbending Loss in Optical Fibers", Bell System Technical Journal, Vol. 54, No. 2, p. 457 (1975); J. Baldauf, "Relationship of Mechanical Characteristics of Dual Coated Single Mode Optical Fibers and Microbending Loss", *IEICE Trans. Commun.*, Vol. E76-B, No. 4, 352 (1993); and K. Kobayashi, "Study of Microbending Loss in Thin Coated Fibers and Fiber Ribbons", IWCS, 386 (1993). The harder outer primary coating, that is, the secondary coating, provides resistance to handling forces such as those encountered when the coated fiber is ribboned and/or cabled.

Optical fiber secondary coating compositions generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure, in turn establishing the cured coating.

In order to allow them to strip errant optical signals away from the core of the optical fiber, primary coatings preferably possess a higher refractive index than the adjoining cladding. Primary coatings should maintain adequate adhesion to the glass fiber during thermal and hydrolytic aging, yet (if needed) is capable of being strippable therefrom for splicing purposes. The primary coating typically has a low in-situ modulus. Such in-situ modulus values are typically, e.g., less than 3 MPa or less than 2 MPa at 25° C., as measured by methods described in U.S. Pat. No. 7,171,103, although significantly lower values are also known. The primary coating typically has a thickness in the range of 20-50 µm (e.g., about 25 or 32.5 µm), with a reduced thickness in the range of 15-25 µm often being used for 200 µm fibers.

The primary coating is typically applied to the glass fiber and subsequently cured. Various additives that enhance one or more properties of the primary coating can also be present, including antioxidants, adhesion promoters, inhibitors, photosensitizers, carrier surfactants, tackifiers, catalysts, stabilizers, surface agents, and optical brighteners.

Secondary coatings are the outer coatings, and are described in, i.a, WO2016028668. The secondary coating is, for example, the polymerization product of a coating composition whose molecules become highly crosslinked when polymerized. The secondary coating typically has a high in situ modulus (e.g., greater than about 800 MPa at 25° C., more preferably from between about 1 GPa to about 3 GPa) and a high $T_g$ (e.g., greater than about 50° C.). The in situ secondary modulus is preferably greater than about 1000 MPa. Secondary coatings often possess a thickness that is less than about 40 µm.

Fiber optic coatings, including the primary and secondary layers, typically are applied using one of two processes: wet-on-wet (WOW) and wet-on-dry (WOD). In the WOD process, the fiber passes first through a primary coating application, which is cured via exposure to ultraviolet (UV) radiation. The fiber then passes through a secondary coating application, which is subsequently cured by similar means. In the WOW process, the fiber passes through both the primary and secondary coating applications, whereupon the fiber proceeds to the curing step. In a wet-on-wet process, the curing lamps between primary and secondary coating application are omitted.

Radiant light energy is used in the manufacture of radiation curable coatings for optical fibers. In particular, curing processes use radiant energy from UV lamps to cure optical fiber coatings. UV lamps with broadband mercury spectra are commonly used in the industry, due to their high intensity and broad emission spectrum to ensure rapid and full cure of such radiation curable coatings.

Increasingly, curing systems utilizing UV-LED (light emitting diodes) lamps have begun to be used as well, as their efficient construction enables a fiber production process with a reduced energy input. An LED curing system offers substantial benefits over conventional mercury lamps including a reduction in power consumption, instant on-off capability, longer lamp life, no substrate heating, reduced maintenance, and more environmental sustainability. Because of this, it is surmised that the demand for UV LED technology's incorporation in optical fiber coating processes will continue to increase in the coming years.

However, LED curing systems are known to impart different demands upon the coatings used therewith. This results in the introduction of new challenges to the coating design. Such challenges will need to be addressed and overcome prior to their full-scale use and acceptance in the fiber optic coating industry. A first challenge is introduced via the fact that LED-based systems typically impart a lower irradiance than conventional mercury lamps at a given wavelength of radiation emitted. In order to compensate for this, and/or because manufacturing costs are reduced, commercially-available LED-based systems have employed light sources that emit a peak spectral output at longer wavelengths into the UV-A spectrum, such as 395 nm, 400 nm, or 405 nm. These longer wavelengths tend to reduce the degree to which the outermost surface of the (typically) secondary coating undergoes curing. US20180163075, assigned to DSM IP Assets B.V., describes secondary coating compositions which offer to alleviate this problem, although additional improvements (which might be combined therewith) are welcome as the industry progresses to ever-higher line and coating speeds.

A second challenge introduced with LED-based light sources tends to lie within the monochromatic nature of the light source itself. LED light sources tend to emit radiation at a narrower distribution of wavelengths when compared with the broadband mercury lamps used in traditional optical fiber coating processes. This has the effect of reducing the homogeneity of the cure throughout the entire depth of the coating, because there is a relative paucity of light of different wavelengths to penetrate the coating and effectuate polymerization at different depths. This effect is exacerbated with pigmented coatings or inks, because pigments absorb additional light, thereby preventing more light from reaching the innermost, or bottom, surface. The pigment screening effect is therefore particularly acute in optical fiber coating processes employing colored secondary coatings or inks that are cured by the predominantly monochromatic LED light sources operating at higher wavelengths. Of course, given the monochromatic nature of LED light source, even clear (non-pigmented) secondary coating systems can exhibit poor degrees of bottom cure, particularly if they are incorporated into high-speed optical fiber coating processes.

As noted, another industry trend is the continued increase in global demand for optical fiber. In order to meet this increasing demand, and also to provide a productivity advantage in such a competitive industry, it would be beneficial to increase, among other things, the speed at which an optical fiber is formed, coated, and cured. Current coating and process technology has enabled most fiber producers to operate draw towers comfortably at line speeds of at least 1000 m/min, with speeds of up to 1500 m/min and even 2500 m/min and higher also possible.

However, as the fiber draw speed increases, several technical challenges are introduced into the process, thereby increasing the difficulty by which a suitably coated optical fiber may be produced. Notably among these is a reduction in the ability of the UV light source to impart sufficient doses of radiation to fully cure the primary and secondary coating compositions due to the reduced relative curing exposure time. This causes, all else being equal, a reduction in the degree of cure of the composition. Yet additional challenges include bubble entrapment, coating delamination, and increased microbend-induced attenuation.

Many of these challenges are induced or exacerbated by an unwanted temperature differential between the freshly drawn glass fiber and the primary coating composition with which it comes into contact. At higher draw speeds, the fiber enters the primary coating die at a temperature that can significantly exceed 50° C. Localized temperatures in high-speed drawing processes may even reach 150° C. All else being equal, as fiber draw speeds increase, the previously molten glass fiber has less time to equilibrate to the ambient temperature at which the primary coating composition is applied. An insufficiently cooled glass fiber will induce a concomitant temperature increase in the primary coating during application, which may persist to the downstream curing step. The coating compositions (especially primary coating compositions) which are not sufficiently thermally resistive will be adversely affected by this phenomenon, therefore leading to a deterioration in the physical properties—and even the commercial viability—of the coated optical fiber produced therefrom.

In view of the foregoing, it would be desirable to provide optical fiber coatings, in particular primary or secondary coatings, and methods of coating optical fibers incorporating primary or secondary coatings, which facilitate superior curing when employed in optical fiber coating processes utilizing LED light sources. Alternatively or additionally, it would be useful to provide optical fiber primary or secondary coatings which exhibit superior processability at higher speeds and/or temperatures. Alternatively, it would also be helpful to provide optical fiber coatings which are both sufficiently fast curing at higher speeds and maintain or exceed existing coating performance standards required by the industry.

BRIEF SUMMARY

Figure 1:
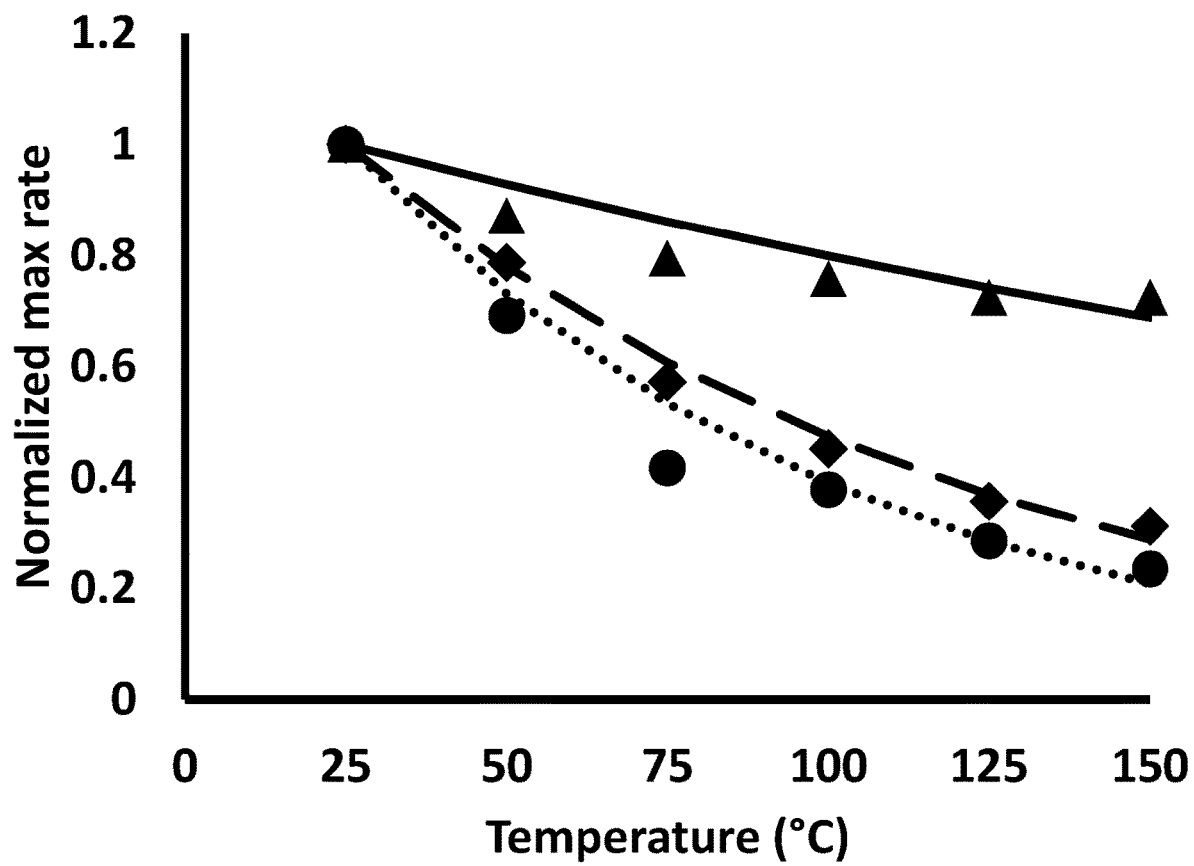
FIG. 1 is a plot of the normalized maximum rate of polymerization as a function of temperature for primary coating compositions incorporating three different photoinitiators.

Described herein are several embodiments of the invention. A first aspect is a radiation curable composition for coating an optical fiber including a urethane acrylate oligomer which is the reaction product of an isocyanate, a polyol, and a (meth)acrylate monomer; a reactive diluent monomer; optionally, one or more additives; and a Norrish Type I photoinitiator; wherein the Norrish Type I photoinitiator satisfies one or both of the following conditions: (a) a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=−$\varepsilon_{HOMO}$); and (b) a normalized rate of polymerization at 150 degrees Celsius (° C.) of greater than 0.5 and up to 1.0, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the Norrish Type I photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm².

According to another embodiment in the first aspect, the optical fiber coating composition is substantially free from a pigment and/or an acyl phosphine oxide photoinitiator. In embodiments according to the first aspect, the coating is a primary coating composition, a clear secondary coating composition, or a colored secondary coating composition.

In yet further embodiments of the first aspect, the composition possesses specified types and amounts by weight of each of the respective compositional constituents, and the Norrish Type I photoinitiator possesses further structural limitations, including alkyl-, aryl-, or acyl-substituted compounds, wherein the alkyl-, aryl-, or acyl-substituted compound also possesses an atom selected from the group consisting of silicon, germanium, tin, and lead.

A second aspect is a method for producing a coated optical fiber including the steps of: drawing a glass optical fiber through a draw tower; applying a primary coating composition onto the surface of the glass optical fiber; optionally, imparting a dose of UV light to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein at least one of the primary coating composition or the secondary coating composition comprises a reactive oligomer comprising an average of at least one polymerizable group; a monomer comprising an average of at least one polymerizable group; and a photoinitiator; wherein the photoinitiator selected satisfies either one or both of the following conditions: (i) a normalized rate of polymerization at 150° C. of greater than 0.5, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm²; and (ii) a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=−$\varepsilon_{HOMO}$).

In yet further embodiments according to the second aspect, the coating process utilizes radiation sources capable of emitting ultraviolet radiation to affect curing of said primary coating composition and said secondary coating composition, wherein the radiation sources include one or more LEDs, wherein one or more LEDs emit actinic radiation with a peak spectral output from 375 nm to 450 nm, or from 375 nm to 410 nm, or from 380 nm to 405 nm, or from 390 nm to 400 nm.

A third aspect is the coated optical fiber formed by any of the methods described according to the second aspect, and using any of the compositions described in the first aspect, wherein the coated optical fiber possesses a mode-field diameter from 8 to 10 µm at a wavelength of 1310 nm, or a mode-field diameter from 9 to 13 µm at a wavelength of 1550 nm, and/or an effective area between 20 and 200 µm².

A fourth aspect of the current invention is an optical fiber cable including a plurality of coated optical fibers disposed within at least a portion of the cable, wherein at least one of the plurality of coated optical fibers comprises a primary coating and/or a secondary coating that is the cured product of a radiation curable composition comprising a photoinitiator according to any of the embodiments of the first aspect.

DETAILED DESCRIPTION

A first aspect of the invention is a radiation curable composition for coating an optical fiber comprising:

a urethane acrylate oligomer which is the reaction product of an isocyanate, a polyol, and a (meth)acrylate monomer;

a reactive diluent monomer;
optionally, one or more additives; and
a Norrish Type I photoinitiator; wherein the Norrish Type I photoinitiator possesses
  (a) a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=$-\varepsilon_{HOMO}$); and/or
  (b) a normalized rate of polymerization at 150 degrees Celsius (° C.) of greater than 0.5 and up to 1.0, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the Norrish Type I photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm$^2$.

The compositions for coating optical fibers according to the first aspect are radiation curable, that is they respond to the exposure of actinic radiation of a certain type (i.e. wavelength or wavelengths) and quantity (i.e. energy dose) by polymerizing. Such coating compositions typically possess a urethane acrylate oligomer and a reactive diluent monomer. Preferably, both the urethane acrylate oligomer and the reactive diluent monomer contain ethylenically unsaturated polymerizable compounds, that is compounds that can contain one or more than one olefinic double bond. The coating compositions described herein also possess a photoinitiator, preferably a free-radical photoinitiator of the Norrish Type I variety. Further optionally included are one or more additives. Each of the aforementioned compositional constituents are described in further detail below. Such components described below may be used in radiation curable compositions according to any of the aspects of the present invention, including coating compositions according to the first aspect, and the compositions used in the methods according to the second aspect. Furthermore, the cured product of the compositions described below may further be used in the coated optical fibers according to any of the embodiments of the third aspect and any of the embodiments of the optical fiber cables according to the fourth aspect.

Suitable compositions for a primary coating include, without limitation, a urethane acrylate oligomer in an amount from 30 wt. % to 90 wt. %; a reactive diluent monomer present from 5 wt. % to 60 wt. %; additives present from 0 wt. % to 40 wt. %; and a Norrish Type I photoinitiator present from 0.005 wt. % to 5 wt. %. Primary coating compositions also often include a glass adhesion promoter. Such a component is either included as an additive, or adhesion-promoting moieties are reacted into the urethane acrylate oligomer or diluent monomer. Primary coatings are also preferably free from a pigment.

Suitable compositions for the secondary coating include, without limitation, three separate ethylenically unsaturated polymerizable compounds: first, about 10 to 85 weight percent of one or more urethane acrylate oligomers; second, about 10 to about 75 weight percent of one or more multifunctional ethylenically unsaturated monomers; and third, about 0 to about 10 weight percent of one or more monofunctional ethylenically unsaturated monomers. Such suitable compositions also include about .01 to about 5 weight percent of one or more photoinitiators. Further, such suitable compositions may include one or more additives, including, without limitation, from about 0 to about 5 pph of one or more slip additives and about 0.5 to about 1.5 pph of one or more antioxidants.

The ethylenically unsaturated polymerizable compounds can contain one or more than one olefinic double bond. They may be low molecular weight (monomeric) or high molecular weight (oligomeric) compounds. An oligomer is a molecule of intermediate relative molecular mass, the structure of which comprises a plurality of units derived, actually or conceptually, from molecules of lower relative molecular mass. As used herein, an "oligomer" possesses a number average molecular mass (Mn) from 600 g/mol to 20,000 g/mol, as measured by gas permeation chromatography (GPC) with a polystyrene standard in tetrahydrofuran.

Urethane Acrylate Oligomers

Generally, optical fiber coating materials comprise as an oligomer a urethane acrylate oligomer, comprising an acrylate group, urethane groups and a backbone. The backbone is derived from a polyol which may be reacted with an isocyanate, such as a diisocyanate, a polyisocyanate, and a hydroxyalkyl acrylate.

As used herein, a polyol is a compound containing two or more hydroxyl groups. Examples of suitable polyols are polyether polyols, polyester polyols, polycarbonate polyols, polycaprolactone polyols, acrylic polyols, and other polyols. These polyols may be used either individually or in combinations of two or more. In a preferred embodiment, the backbone of the urethane acrylate oligomer comprises a compound derived from a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In a preferred embodiment, the particular block refers to a polyether block, which is derived from one or more of the polyols, preferably polyether polyols, described elsewhere herein. In an embodiment, the block to which a mono-, di-, and/or tri-block copolymer refers is a polyether block which is derived from one or more of the polyols described elsewhere herein. In an embodiment, a monoblock copolymer may be described as a copolymer having only an average of around 1, or from about 0.9 to less than 1.5 units of a particular block, such as a polyether block. In an embodiment, a diblock copolymer may be described as a copolymer having an average of around 2, or from at least 1.5 to less than 2.5 units of a particular block, such as a polyether block. In an embodiment, a triblock copolymer may be described as a copolymer having an average of around 3, or from at least 2.5 to less than 3.5 units of a particular block, such as a polyether block. The number of polyether units in a given oligomer may be determined by the number of polyether polyol molecules utilized in the synthesis of a single oligomer.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronic (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. In an embodiment, polyols containing polytetramethylene glycol and copolymer glycols of butylene oxide and ethylene oxide are particularly preferred.

The number average molecular weight derived from the hydroxyl number of these polyols is usually from about 50 to about 15,000, and preferably from about 1,000 to about 5,000. As used herein, unless otherwise specified, molecular weight refers to a number average molecular weight, as specified in grams/mol (g/mol).

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates are isophorone diisocyanate, 2,2,4-trimethyihexamethylene diisocyanate, 2,4-tolylene diisocyanate, and 2,6-tolylene diisocyanate.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxy ethyl(meth)acrylate, 2-hydroxypropylacrylate and 2-hydroxy-3-oxyphenyl(meth)acrylate. Acrylate functional groups are preferred over methacrylates.

The ratio of polyol, polyisocyanate, and hydroxyl group-containing (meth)acrylate used for preparing the urethane (meth)acrylate is determined so that about 1.1 to about 3 equivalents of an isocyanate group included in the polyisocyanate and about 0.1 to about 1.5 equivalents of a hydroxyl group included in the hydroxyl group-containing (meth) acrylate are used for one equivalent of the hydroxyl group included in the glycol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt. % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in the range from about 600 to about 10,000, and more preferably from about 600 to about 5,000. If the number average molecular weight of the urethane (meth)acrylate is less than about 100, the resin composition tends to solidify; on the other hand, if the number average molecular weight is larger than about 20,000, the viscosity of the composition becomes high, making handling of the composition difficult. Preferred for secondary coatings are oligomers having a number average molecular weight between about 1,000 and about 3,000.

Other oligomers that can be used include polyester(meth) acrylate, epoxy(meth)acrylate, polyamide(meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based acrylate oligomers such as alkoxylated bisphenol-A-diacrylate and diglycidyl-bisphenol-A-diacrylate.

Beside the above-described components, other curable oligomers or polymers may be added to the liquid curable resin composition of the present invention to the extent that the characteristics of the liquid curable resin composition are not adversely affected.

Preferred oligomers are polyether-based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used.

Further suitable polyols are polymers and copolymers which contain hydroxyl groups in the polymer chain or in side groups, for example polyvinyl alcohol and copolymers thereof or hydroxyalkyl polymethacrylates or copolymers thereof. Other suitable polyols are oligoesters carrying hydroxyl end groups. Illustrative examples of aliphatic and cycloaliphatic polyols are alkyl enediols containing for example 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of for instance 200 to 1500, 1,3-cyclopentanediol, 1,2-, 1,3- or 1,4-cyclohexanediol, 1,4-dihydroxymethylcyclohexane, glycerol, tris(-hydroxyethyl) amine, trimethylolethane, trimethylolpropane, pentaerythritol, dipentaerythritol and sorbitol. The polyols may be esterified partially or completely with one or with different unsaturated carboxylic acids, in which case the free hydroxyl groups of the partial esters may be modified, for example etherified, or esterified with other carboxylic acids. Illustrative examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexacrylate, oligoester acrylates and methacrylates, glycerol di- and -triacrylate, 1,4-cyclohexanediacrylate, bisacrylates and bis-methacrylates of polyethylene glycol having molecular weights of 200 to 1500, or mixtures thereof. Polyfunctional monomers and oligomers are available for example from UCB Chemicals of Smyrna, Georgia, and Sartomer of Exton, Pennsylvania One or more of the aforementioned urethane acrylate oligomers can be employed in compositions according to the present invention in any suitable amount, and may be chosen singly or in combination of one or more of the types enumerated herein. In a preferred embodiment, the urethane acrylate oligomer component is present in an amount, relative to the entire weight of the composition, from 10 wt. % to 85 wt. %, or from 10 wt. % to 80 wt. %., or from 10 wt. % to 60 wt. %, or from 15 wt. % to 50 wt. %.

Reactive Diluent Monomers

Compositions according to the present invention may also include one or more reactive diluent monomers. As used herein, a "diluent" means a substance which reduces the viscosity of the greater composition into which it is added or with which it is associated. A variety of diluents are used to maximize the flowability, and in turn the processability, of the optical fiber coating compositions with which they are associated.

To maximize curability of the composition associated therewith, the diluent component preferably comprises, consists of, or consists essentially of reactive diluents. As used herein, "reactive" means the ability to form a chemical reaction, preferably a polymerization reaction, with another molecule. As such, a reactive compound will be said to possess at least one reactive, or functional, group. It is preferred that such reactive or functional group is a polymerizable group.

Also, as used herein, a monomer is a molecule of low relative molecular mass, the structure of which can undergo polymerization thereby contributing constitutional units to the essential structure of a macromolecule. As used herein, a component is considered a monomer if it further possesses a number average molecular weight (Mn) that is less than about 1000 g/mol. In an embodiment, the reactive diluent component consists of one or more reactive diluent monomers having an Mn from about 86 g/mol (the molar mass of methyl acrylate) to 800 g/mol, or from 100 g/mol to 350 g/mol, as measured by an NMR method.

The reactive diluent monomers according to the invention may comprise, consist essentially of, or consist of reactive diluent monomers having at least one polymerizable group. In a preferred embodiment, the reactive diluent monomers consist of reactive diluent monomers having, on average, one polymerizable group. The polymerizable group(s) of the reactive diluent monomers are preferably able to (co)polymerize with the polymerizable groups present in the associated reactive oligomer component. Such monomers are known as "monofunctional".

The polymerizable groups of the reactive diluent monomer may be of any known type. In an embodiment, however, the polymerizable group may comprise, consist essentially of, or consist of acrylate, acrylamide, or N-vinyl amide groups, or any combination thereof. The reactive diluents are preferably ethylenically unsaturated polymerizable compounds that contain at least one reactive olefinic double bond.

The polymerizable group(s) may occur at any feasible point along the length of the reactive diluent monomer. In a preferred embodiment, however the polymerizable groups comprise, consist essentially of, or consist of polymerizable endgroups.

Typical examples of reactive diluent monomers containing one double bond are alkyl or hydroxyalkyl acrylates, for example methyl, ethyl, butyl, 2-phenoxy ethyl, 2-ethylhexyl, and 2-hydroxyethyl acrylate, isobornyl acrylate, methyl and ethyl acrylate, lauryl-acrylate, ethoxylated nonyl-phenol acrylate, and diethylene-glycol-ethyl-hexyl acylate (DE-GEHA). Further examples of these monomers are acrylonitrile, acrylamide, N-substituted acrylamides, vinyl esters such as vinyl acetate, styrene, alkylstyrenes, halostyrenes, N-vinylpyrrolidone, N-vinyl caprolactam, vinyl chloride and vinylidene chloride. Such compounds are monofunctional ethylenically unsaturated monomers.

Reactive diluent monomers may include components which are multifunctional; that is, having more than one reactive group. Such an example includes monomers containing more than one double bond such as, without limitation, ethylene glycol diacrylate, propylene glycol diacrylate, tripropylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, and vinyl acrylate. Such compounds are multifunctional ethylenically unsaturated monomers.

One or more of the aforementioned monofunctional and/or multifunctional ethylenically unsaturated monomers can be employed in compositions according to the present invention in any suitable amount, and may be chosen singly or in combination of one or more of the types enumerated herein.

In an embodiment, the monofunctional ethylenically unsaturated monomer is present in an amount by weight, relative to the weight of the entire composition, from 0 to 20 wt. %, or from 0 to 10 wt. %, or from 1 to 20 wt. %, or from 1 to 10 wt. %, or from 2 to 20 wt. %, or from 2 to 10 wt. %, or from 2 to 10 wt. %.

In another embodiment, the multifunctional ethylenically unsaturated monomer is present in an amount by weight, relative to the entire weight of the compositions, from 10 to 75 wt. %, or from 10 to 65 wt. %, or from 10 to 60 wt. %, or from 10 to 50 wt. %, or from 15 to 70 wt. %, or from 15 to 60 wt. %, or from 20 to 60 wt. %.

Photoinitiators

Compositions of the present invention also include a photoinitiator. In a preferred embodiment, the photoinitiator is a free-radical photoinitiator. A photoinitiator is a compound that chemically changes due to the action of light or the synergy between the action of light and the electronic excitation of a sensitizing dye to produce at least one of a radical, an acid, and a base. In a preferred embodiment, the photoinitiator is a free-radical photoinitiator which is capable of initiating or facilitating the initiation of the polymerization reaction amongst the urethane acrylate oligomer and/or the reactive diluent monomer.

Typically, free radical photoinitiators or photoinitiating systems are divided into two main classes. The first include those which, after exposure to sufficient irradiation, form radicals via cleavage (often of the α-bond of a carbonyl compound). These are also known as α-cleavage photoinitiators or "Norrish Type I" photoinitiators. The second class, or "Norrish Type II" photoinitiators, include those which, after exposure to sufficient radiation, form radicals via a hydrogen abstraction process. This hydrogen abstraction process can, in principle, be intra- as well as inter-molecular. In cases where the process involves intermolecular abstraction, i.e., where an external hydrogen donor is used for initiation, the photoinitiator it is not a single compound but a bimolecular system.

As the initiation is often based on a bimolecular reaction, the Norrish Type II photoinitiators are generally slower than Norrish Type I photoinitiators which are based on the unimolecular formation of radicals. On the other hand, Norrish Type II photoinitiators are generally considered to possess better optical absorption properties in the near-UV spectroscopic region. However, inventors hypothesize that Type II photoinitiators are less preferable for use in compositions according to the current invention, because they are not thought to be as effective at initiating polymerizing reactions at elevated temperatures.

Photolysis of aromatic ketones, such as benzophenone, thioxanthones, benzil, and quinones, in the presence of hydrogen donors, such as alcohols, amines, or thiols leads to the formation of a radical produced from the carbonyl compound (ketyl-type radical) and another radical derived from the hydrogen donor. The photopolymerization of vinyl monomers is usually initiated by the radicals produced from the hydrogen donor. The ketyl radicals are usually not reactive toward vinyl monomers because of the steric hindrance and the delocalization of an unpaired electron.

In accordance with an embodiment, the composition includes at least one free radical photoinitiator selected from the group consisting of benzoyl phosphine oxides, aryl ketones, benzophenones, hydroxylated ketones, 1-hydroxyphenyl ketones, ketals, metallocenes, and any combination thereof.

In an embodiment, the composition includes at least one free-radical photoinitiator selected from the group consisting of 2,4,6-trimethylbenzoyl diphenylphosphine oxide and 2,4,6-trimethylbenzoyl phenyl, ethoxy phosphine oxide, bis (2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl)phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino)benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl(1-hydroxyisopropyl)ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl]propanone], camphorquinone, 4,4'-bis(diethylamino)benzophenone, benzil dimethyl ketal, bis (eta 5-2-4-cyclopentadien-1-yl) bis[2,6-difluoro-3-(1H-pyrrol-1-yl) phenyl] titanium, and any combination thereof.

For light sources emitting in the 300-475 nm wavelength range, especially those emitting at 365 nm, 390 nm, or 395 nm, examples of suitable free-radical photoinitiators absorbing in this area include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Omnirad 819 or BAPO from IGM), 2-methyl-1-[4-(methylthio)phenyl]-2-morpholinopropanone-1 (Omnirad 907 from IGM), 2-benzyl-2-(dimethylamino)-1-[4-(4-morpholinyl) phenyl]-1-butanone (Omnirad 369 from IGM), 2-dimethylamino-2-(4-methyl-benzyl)-1-(4-morpholin-4-yl-phenyl)-butan-1-one (Omnirad 379 from IGM), 4-benzoyl-4'-methyl diphenyl sulphide (Chivacure BMS from Chitec), 4,4'-bis(diethylamino)benzophenone (Chivacure EMK from Chitec), and 4,4'-bis(N,N'-dimethylamino)benzophenone (Michler's ketone). Also suitable are mixtures thereof. These acyl phosphine oxide photoinitiators are preferred since they have a good delocalization of the phosphinoyl radical upon photo irradiation.

According to a preferred embodiment of the present invention, the free-radical photoinitiator is of the Norrish Type I variety. In addition to those already named, Norrish Type I photoinitiators include, inter alia, acylphosphine oxide photoinitiators and certain alkyl-, aryl-, or acyl-substituted compounds which possess or are centered around an atom in the Carbon (Group 14) group, such as carbon, silicon, germanium, tin, and lead.

A well-known free-radical photoinitiator for use in optical fiber coating applications is an acylphosphine oxide photoinitiator. Acylphosphine oxide photoinitiators are disclosed for example in U.S. Pat. Nos. 4,324,744, 4,737,593, 5,942,290, 5,534,559, 6,020,528, 6,486,228, and 6,486,226.

The acylphosphine oxide photoinitiators are bisacylphosphine oxides (BAPO) or monoacylphosphine oxides (MAPO).

The bisacylphosphine oxide photoinitiators are of the following formula:

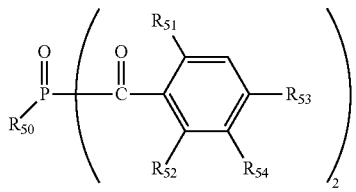

wherein $R_{50}$ is $C_1$-$C_{12}$ alkyl, cyclohexyl or phenyl which is unsubstituted or is substituted by 1 to 4 halogen or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl.

For example, $R_{50}$ is $C_2$-$C_{10}$ alkyl, cyclohexyl or phenyl which is unsubstituted or is substituted by 1 to 4 $C_1$-$C_4$ alkyl, Cl or Br. Another embodiment is where $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. For instance, $R_{50}$ is $C_4$-$C_{12}$ alkyl or cyclohexyl, $R_{51}$ and $R_{52}$ are each independently of the other $C_1$-$C_8$ alkyl or $C_1$-$C_8$ alkoxy and $R_{53}$ is hydrogen or $C_1$-$C_8$ alkyl. For instance, $R_{51}$ and $R_{52}$ are $C_1$-$C_4$ alkyl or $C_1$-$C_4$ alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl. For example, $R_{51}$, $R_{52}$ and $R_{53}$ are methyl. Another embodiment is where $R_{51}$, $R_{52}$ and $R_{53}$ are methyl and $R_{54}$ is hydrogen. Another embodiment is where $R_{50}$ is $C_3$-$C_8$ alkyl. For example, $R_{51}$ and $R_{52}$ are methoxy, $R_{53}$ and $R_{54}$ are hydrogen and $R_{50}$ is isooctyl. For instance, $R_{50}$ is isobutyl. For example, $R_{50}$ is phenyl. The present bisacylphosphine oxide photoinitiator is for example bis(2,4,6-trimethylbenzoyl)-phenyl phosphine oxide (CAS #162881-26-7) or is bis(2,4,6-trimethylbenzoyl)-(2,4-bis-pentyloxyphenyl)phosphine oxide.

The monoacylphosphine oxide photoinitiators are of the following formula:

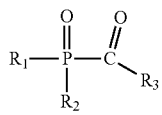

in which $R_1$ and $R_2$ independently of one another are $C_1$-$C_{12}$alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$; $R_3$ is phenyl which is unsubstituted or substituted from one to four times by $C_1$-$C_8$ alkyl, $C_1$-$C_8$ alkoxy, $C_1$-$C_8$ alkylthio and/or halogen; and $R_4$ is $C_1$-$C_8$ alkyl, phenyl or benzyl. For example, $R_1$ is —$OR_4$. For example, $R_2$ is phenyl which is unsubstituted or substituted from one to four times by halogen, $C_1$-$C_8$ alkyl and/or $C_1$-$C_8$ alkoxy. For example, $R_3$ is phenyl which is unsubstituted or substituted from one to four times by $C_1$-$C_8$ alkyl. For example, the present monoacylphosphine oxide is 2,4,6-trimethylbenzoylethoxyphenylphosphine oxide or 2,4,6-trimethylbenzoyldiphenylphosphine oxide.

Inventors have presently and surprisingly discovered that certain types of photoinitiators, and especially certain Norrish Type I photoinitiators, facilitate a higher degree of cure in the optical fiber coating compositions associated therewith when compared to other conventionally-used variants. This is especially true under at least two different application-specific conditions. First, such photoinitiators have been presently discovered to improve surface cure and/or through-cure of a clear or colored optical fiber secondary coating when the coating is subjected to an optical fiber coating process incorporating LED-based light sources, especially those wherein the LED light sources emit a peak spectral output from 375 nanometers (nm) to 450 nm, or from 375 nm to 410 nm, or from 380 nm to 405 nm, or from 390 nm to 400 nm. This is surprisingly true even though such photoinitiators may otherwise possess a reduced absorption efficiency relative to other, existing photoinitiators at the wavelengths at which such LED light sources emit peak irradiance.

Second, such photoinitiators impart improved initiation efficiency when subjected to elevated temperatures. This discovery is particularly important in the field of fiber optic coatings, because as line speeds continue to increase, the inherent additional thermal stresses imparted upon radiation curable coatings, along with the associated photoinitiators used therein, have a larger effect upon cure performance than previously thought.

It has long been known that, all else being equal, as line speeds increase, the dose of actinic energy imparted into any fixed section of a liquid radiation curable composition for coating an optical fiber concomitantly decreases. Even assuming a static photoinitiation efficiency, this naturally concomitantly decreases the window of space and time in which the photoinitiator in a radiation curable composition for coating optical fibers is allotted to induce polymerization sufficient to form a cured coating with commercially-acceptable properties. Such problems induced by higher-speed drawing application would be expected to be offset by an increase in the intensity of the radiation sources, an increase in the photoinitiator concentration, or an increase in the path along which radiation sources were placed (along with an increase in the number of radiation sources themselves).

Inventors believe, however, that without selection of an appropriate photoinitiator, such remedial actions are not able to sufficiently offset for the otherwise reduced energy dose brought on by higher line speeds. This is because the associated temperature increases result in a marked reduction in the efficiency of the photoinitiator used in existing optical fiber coating compositions. Thus, as line-speeds, and in turn temperatures, increase above certain values, inventors have surprisingly discovered that known coating compositions exhibit an exponentially decreased ability to form fully-cured coatings on an optical fiber, because they are less efficient at photoinitiation per given unit of energy absorbed. Without wishing to be bound by any theory, inventors believe this is because the addition of a photoinitiator radical to an acrylate is an equilibrium reaction and the equilibrium, and in turn initiation efficiency, shifts upon increases in the temperature at which the reaction occurs.

Armed with this understanding, Inventors have discovered that certain types of photoinitiators—especially the same Norrish Type I free-radical photoinitiators with certain characteristics that facilitate LED cure described above—surprisingly exhibit an initiation efficiency that is significantly less reduced by increases in temperature. The use of such photoinitiators is presently discovered to be beneficial for use in high-speed and/or low-helium optical fiber coating processes, because such processes are known to heat the coating compositions used—and especially the primary coating compositions—to levels not experienced in conventional coating processes.

In order to be useful in accommodating optical fiber coating processes with ever-increasing line speeds, the photoinitiator selected must maintain a high degree of efficiency at temperatures of up to 150° C. or more. Therefore, in an embodiment, the photoinitiator must possess a normalized rate of polymerization that is greater than the photoinitiators heretofore known to be used in optical fiber coating compositions. As used herein, the normalized rate of polymerization is the maximum polymerization rate (in mmol/kg sec) of a mixture at a specified temperature, as expressed in ° C., divided by the maximum polymerization rate of the mixture at 25° C., wherein the mixture comprises 1 part by weight of the photoinitiator(s) being evaluated and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm². In an embodiment, therefore, the normalized rate of polymerization at 150° C. of the photoinitiator(s) used is greater than 0.5, or greater than 0.6, or greater than 0.7. In an embodiment, the normalized rate of polymerization at 150° C. of the photoinitiator(s) chosen is between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75.

In view of the foregoing, Inventors further theorize that the oxidation potential of a photoinitiator's triplet state is an important predictor in determining whether such a photoinitiator is adept at either: (1) facilitating sufficient initiation efficiency at higher temperatures, such as those encountered in optical fiber coating processes operating at high line speeds; or (2) the promotion of satisfactory initiation and cure throughout the coating depth during exposure to radiation at UVA wavelengths from relatively monochromatic light sources, such as LEDs; or both. This surprising discovery becomes helpful to being able to prescribe a radiation curable primary or secondary coating composition that will cure and process sufficiently in, inter alia, high-speed optical fiber coating processes utilizing UV-LED radiation sources.

Unfortunately, it is virtually impossible to directly determine via cyclic voltammetry the oxidation potential of these excited triplet states, due to their miniscule lifetimes. However, Inventors have relied upon an alternative way to quantify a component's oxidation potential via derivation of its ionization potential, i.e. the energy required to lose one of its electrons (X=energy+ $\rightarrow$ X$^+$+e$^-$). The ionization potential has been obtained from quantum mechanical calculations employing the B3LYP/6-31G(d) method in combination with Koopman's Theorem, which states that the ionization potential can be calculated as the negative of the orbital energy of the highest occupied molecular orbital (HOMO) or expressed as an equation as: IP=−ε$_{HOMO}$. This method is further described in U.S. Pat. No. 9,708,442, assigned to DSM IP Assets B.V.

In a preferred embodiment, therefore, the Norrish Type I photoinitiator is chosen such that it possesses a triplet state ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV. Bisacylphosphine oxide (BAPO) possesses a triplet state ionization potential, as stated in US9708442, of 3.98; therefore, in an embodiment, the coating composition is free from, or contains less than 0.1% by weight of, a BAPO compound.

According to another embodiment, the Norrish Type I photoinitiator is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of carbon, silicon, germanium, tin, and lead. In an embodiment, the alkyl-, aryl-, or acyl-substituted photoinitiator is an acylgermanium compound. Such photoinitiators are described in, U.S. Pat. No. 9,708,442, assigned to DSM IP Assets B. V., which is hereby incorporated by reference in its entirety.

In an embodiment, the Norrish Type I photoinitiator is a germanium-based compound that possesses a structure in accordance with the following formula (I):

in which Ar$_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups. Polymerizable compositions with acylgermanium compounds are described in, i.a, U.S. Pat. No. 7,605,190, assigned to Ivoclar Vivadent AG.

In an embodiment, each of $R_1$-$R_3$ is an aryl-substituted or aromatic acyl group. In an embodiment, exactly two of $R_1$-$R_3$ are an aryl-substituted or aromatic acyl group, with the remaining substituted groups being a $C_1$-$C_{10}$, or a $C_1$-$C_6$, or a $C_1$-$C_3$ alkyl. In an embodiment, exactly one of $R_1$-$R_3$ is an aryl-substituted or aromatic acyl group, with the remaining two substituted groups being a $C_1$-$C_{10}$, or a $C_1$-$C_6$, or a $C_1$-$C_3$ alkyl. In another embodiment, each of $R_1$-$R_3$ is a $C_1$-$C_{10}$, or a $C_1$-$C_6$, or a $C_1$-$C_3$ alkyl.

In an embodiment, the acylgermanium photoinitiator is a compound possessing one of the following molecular structures:

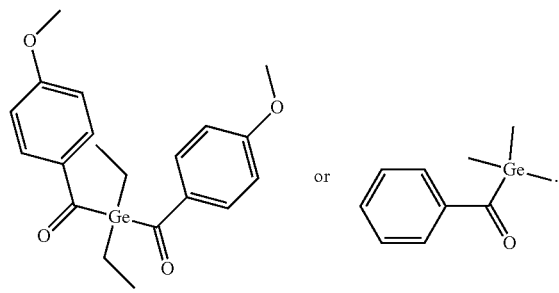

In an embodiment, the free-radical photoinitiator is an acylgermanium compound. In an embodiment, the acylgermanium is a benzoyl trimethyl germane (BTG) or bis acyl germanoyl (commercially available as Ivocerin® from Ivoclar Vivadent AG, 9494 Schaan/Liechtenstein).

One or more of the aforementioned photoinitiators can be employed in compositions according to the present invention in any suitable amount, and may be chosen singly or in combination of one or more of the types enumerated herein. Such improved Norrish Type I photoinitiators may be included exclusively, that is, the radiation curable composition consists only of those Norrish Type I photoinitiators herein described, or alternatively such compositions may consist essentially of those Norrish Type I photoinitiators herein described. In a preferred embodiment, the photoinitiator component is present in an amount, relative to the entire weight of the composition, from about 0.001 wt. % to about 10 wt. %, or from 0.005 wt. % to 5 wt. %, or from about 0.01 wt. % to about 5 wt. %, or from about 0.1 wt. % to about 3 wt. %.

Additives

Additives are also typically added to optical fiber coatings to achieve certain desirable characteristics such as improved shelf life, glass adhesion, improved coating oxidative and hydrolytic stability, and the like. There are many different types of desirable additives, and the invention discussed herein is not intended to be limited by these, nevertheless they are included in the envisioned embodiments since they have desirable effects.

Examples of these are thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributyl phosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, paraffin or similar wax like substances can be added; these migrate to the surface on commencement of the polymerization because of their low solubility in the polymer, and form a transparent surface layer which prevents the ingress of air. It is likewise possible to apply an oxygen barrier layer.

Light stabilizers which can be added are UV absorbers, for example well known commercial UV absorbers of the hydroxyphenyl benzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines are for example:

2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2- hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-ditbutylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

When the composition is a primary coating, the additive component includes, consists of, or consists essentially of one or more adhesion promoter compounds. Adhesion promoters provide a link between the polymer primary coating and the surface of the optical glass fiber. Silane coupling agents, which are hydrolyzable, have been used as glass adhesion promoters. Silane coupling agents are described in, i.a, U.S. Pat. No. 4,932,750. In an embodiment, the adhesion promoter is a hydrolysable silane compound which contains a mercapto group and/or a plurality of alkoxy groups. Such adhesion promoters are known and are described in, U.S. Pat. App. No. 20020013383, the relevant portions of which are hereby incorporated by reference.

In an embodiment, the adhesion promoter includes one or more of gamma-mercaptopropyltrimethoxysilane, trimethoxysiliylpropyl acrylate, or 3-trimetoxysilylpropane-1-thiol. Silane coupling groups may alternatively be reacted onto oligomers in the oligomer component; in such case they will be considered not as an additive but as part of the oligomer component.

Colorants, such as dyes or pigments, are known. In a preferred embodiment of the present invention, however, the composition does not contain a colorant, such as a pigment, to the extent a primary or clear secondary coating composition is employed. In a preferred embodiment, the primary coating composition or clear secondary coating composition for an optical fiber according to the first aspect comprises, relative to the weight of the entire composition, less than 0.1 wt. % of a pigment, or less than 0.05 wt. %, or less than 0.01 wt. %, or less than 0.005 wt. %. In an embodiment, the clear secondary coating composition contains 0 wt. % of a pigment.

In other potential embodiments, however, the composition is a colored secondary coating composition or an ink composition. In such embodiments, the colored secondary or ink composition includes one or more pigments. Broadly speaking, a pigment is a material that changes the color of reflected or transmitted light as the result of wavelength-selective absorption. Pigments for use in optical fiber coatings are well-known. Commercial examples include: titanium dioxide white (Dupont R-960), carbon black (Degussa Special 4A or Columbian Raven 420), lamp black (General carbon LB #6), phtalo blue G (Sun 249-1282), phtalo blue R (Cookson BT698D), phtalo green B (Sun 264-0238), phtalo green Y (Mobay G5420), light chrome yellow (Cookson Y934D), diarylide yellow (Sun 274-3954), organic yellow (Hoechst H4G), medium chrome yellow (Cookson Y969D), yellow oxide (Pfizer YL02288D), lead free-yellow (BASF Paliotol 1770), raw umber (Hoover 195), burnt umber (Lansco 3240X), lead free orange (Hoechst RL70), red oxide (Pfizer R2998D), moly orange (Cookson YL988D), arylide red (Hoechst F5RKA), quinacridone red (Ciba RT759D), and quinacridone violet (Ciba RT887D). Further pigments are described in WO1990013579A1.

In addition to pigments, in order to enhance color, the novel compositions may also include a photoreducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253.

For colored secondary or ink compositions, any suitable type or quantity of pigment may be used, and may be selected in combinations of two or more above of the types enumerated herein. In an embodiment, the pigment is present in an amount, relative to the weight of the entire composition, from 0.001 wt. % to 5 wt. %, or from 0.005 wt. % to 3 wt. %, or from 0.01 wt. % to 1 wt. %.

Other Additives

To accelerate the photopolymerization it is possible to add accelerators, coinitiators and autoxidizers such as thiols, thioethers, disulfides and phosphines, as are described, for example, in EP-A-438 123 and GB-A-2 180 358.

The photopolymerization can also be accelerated by the addition of photosensitizers, which shift or broaden the spectral sensitivity. These are, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes.

The curing procedure can be assisted, by adding a component which forms free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817.

The novel compositions can also include a photoreducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253.

Other conventional additives may be used depending on the intended application. Examples include fillers, wetting agents or levelling assistants. Thick coatings can also contain glass microbeads or powdered glass fibers, as described in U.S. Pat. No. 5,013,768, for example.

One or more of the aforementioned additives can be employed in compositions according to the present invention in any suitable amount, and may be chosen singly or in combination of one or more of the types enumerated herein. In a preferred embodiment, the additive component is present in an amount, relative to the entire weight of the composition, of from about 0.01 wt. % to about 5 wt. %, more preferably from about 0.1 wt. % to about 2 wt. %. According to another embodiment, the one or more of the aforementioned additives are included in an amount from about 1 wt. % to about 5 wt. %.

A second aspect of the invention is a method for producing a coated optical fiber comprising the steps of:

(a) drawing a glass optical fiber through a draw tower;

(b) applying a primary coating composition onto the surface of the glass optical fiber;

(c) optionally, imparting a dose of UV light to at least partially cure said primary coating composition;

(d) applying a secondary coating composition to the primary coating composition;

(e) exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating;

wherein at least one of the primary coating composition or the secondary coating composition comprises a reactive oligomer comprising an average of at least one polymerizable group;

a monomer comprising an average of at least one polymerizable group; and a photoinitiator;

wherein the photoinitiator possesses (i) a normalized rate of polymerization at 150° C. of greater than 0.5, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm$^2$, or (ii) a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=$-\varepsilon_{HOMO}$).

In a preferred embodiment, the one or more LEDs emit actinic radiation with a peak spectral output from 375 nm to 450 nm, or from 375 nm to 410 nm, or from 380 nm to 405 nm, or from 390 nm to 400 nm. Alternatively, the lights sources may consist exclusively of LED light sources which are capable of emitting actinic radiation with a peak spectral output from 375 nm to 410 nm, or from 380 nm to 405 nm, or from 390 nm to 400 nm.

As noted previously, methods of coating optical fibers are well-known generally. Any of the coatings and photoinitiators described in the embodiments of the first aspect of the invention may be incorporated in the methods according to the second aspect.

In an embodiment, the method for producing a coated optical fiber is carried out at elevated line speeds, such as at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min.

A third aspect of the invention is a coated optical fiber produced by any of the methods according to the second aspect, and/or utilizing any of the radiation curable coating compositions according to the first aspect. Any optical fiber type may be used in embodiments of the present invention. In a preferred embodiment, however, the coated optical fiber possesses a mode-field diameter from 8 to 10 µm at a wavelength of 1310 nm, or a mode-field diameter from 9 to 13 µm at a wavelength of 1550 nm, and/or an effective area between 20 and 200 µm$^2$. Such fibers may be single mode and/or large-effective area fibers, given the expected demand for coating processes for these fibers that utilize higher line or processing speeds. However, other fiber types, such as multimode fibers, may be used as well.

A fourth aspect of the invention is an optical fiber cable comprising a plurality of coated optical fibers disposed within at least a portion of the cable, wherein at least one of the plurality of coated optical fibers comprises a coating that is the cured product of a radiation curable composition comprising a photoinitiator as described in any of the embodiments of the first aspect.

The optical fiber cables according to the fourth aspect of the invention preferably comprise a plurality of coated optical fibers according to the third aspect, which coated optical fibers have been coated and processed according to the methods of the invention according to the second aspect from the radiation curable coatings according to the first aspect.

Improved compositions, especially primary coating compositions, clear secondary coating compositions, and colored secondary coating compositions, for use in high-speed optical fiber coating applications and/or utilizing LED curing sources, may be formulated via the selection of components and formulation guidelines specified above herein, and further readily tuned by those of ordinary skill in the art to which this invention applies by following and/or extrapolating from the general approaches taken in the embodiments illustrated in the examples below. The following such examples further illustrate the invention but, of course, should not be construed as in any way limiting its scope.

EXAMPLES

These examples illustrate embodiments of the instant invention. Tables 1A and 1B describe the various components of the compositions used in the present examples. Table 2 describes the triplet state ionization potentials of various known photoinitiators. Tables 3A, 3B, and 3C, meanwhile, depict various experimental results for compositions suitable as primary coatings, clear secondary coatings, and colored secondary coatings, respectively.

TABLE 1A

Raw materials used to create formulations described in Tables 3A-3C.

| Component | Chemical Descriptor | Supplier/Manufacturer |
| --- | --- | --- |
| Oligomer A | Urethane acrylate oligomer (see Table 1b for reactants) | DSM Desotech, Inc. |
| Oligomer 1 | Urethane acrylate oligomer (see Table 1b for reactants) | DSM Desotech, Inc. |
| CN120Z | Bisphenol A diacrylate; CAS 42978-66-5 | Sartomer |
| SR 306 | difunctional tripropylene glycol diacrylate; CAS 94120-00-0 | Sartomer |
| SR 504 | Ethoxylated nonyl phenol acrylate; CAS 41484-35-9 | Sartomer |
| SR 339 | 2-phenoxyethyl acrylate; CAS 48145-04-6 | Sartomer |
| Irganox ® 1035 | Benzenepropanoic acid antioxidant, 3,5-bis(1,1-dimethylethyl)-4-hydroxy-, 1,1'-(thiodi-2,1-ethanediyl) ester; CAS 41484-35-9 | BASF |
| Silquest* A-189 | Gamma-mercaptopropyltrimethoxysilane; CAS 56938-96-6 | Momentive Performance Materials |
| TPO | Diphenyl(2,4,6-trimethylbenzoyl)phosphine oxide; CAS 75980-60-8 | Sigma-Aldrich |
| Omnirad 819 ("BAPO") | Bis(2,4,6-trimethylbenzoyl)-phenylphosphineoxide; CAS 162881-26-7 | IGM |
| Ivocerin ® ("BAG") | Bis acyl germanoyl photoinitiator; CAS 1207515-90-9 | Synthon Chemicals GmbH |
| Yellow Dispersion | Proprietary yellow pigment | DSM Desotech, Inc. |
| DOWSIL ™ 57 | nonreactive silicone glycol copolymer surfactant; CAS 70914-12-4 | Dow Corning |
| DOWSIL ™ 190 | wetting agent; PEG, PPG-18, 18 Dimethicone | Dow Corning |

TABLE 1B

Oligomer Reactants. Listed in amount by weight %.

| Component | Supplier | Oligomer A | Oligomer 1 |
| --- | --- | --- | --- |
| Mixture blend of 80% 2,4-toluene diisocyanate and 20% 2,6-toluene diisocyanate; CAS 26471-62-5 and 584-84-9 (TDS 80/20) | Multiple | 21.25 | 0 |
| 2,4-toluene diisocyanate (TDS) | Multiple | 0 | 11.05 |
| 3,5-Di-tert-butyl-4-hydroxytoluene (BHT food grade) | Lanxess | 0.10 | 0.31 |
| Acrylic acid; 99% purity; CAS 79-10-7 | BASF | 0 | 0.02 |
| 2-Hydroxy ethyl acrylate (2-HEA); CAS 818-61-1 | BASF | 14.17 | 4.92 |
| Dibutyl tin dilaurate (DBTDL); CAS 77-58-7 | Vertellus | 0.05 | 0.06 |
| 1000 MW propylene glycol-based polyether polyol diol (Pluracol ® P1010) | BASF | 64.43 | 0 |
| Polypropylene glycol nominal 2000 mol. Wt. (Lupranol 1000) | BASF | 0 | 83.65 |
| TOTAL | | 100.00 | 100.00 |

Oligomer A Synthesis

To create oligomer A, all components are used in the ratios specified in Table 1B above. A 500 mL four-necked and dry flask was charged with 63.75 g of TDS 80/20 and 0.30 g of stabilizer (BHT) to a reactor and maintained at ambient temperature while stirring under dry air. Next, 42.51 g of 2-Hydroxy ethoxyl acrylate (HEA) was added. Then, the reactive endcapper (HEA) was metered-in at such a rate so as to limit the reaction temperature to less than 60° C., stir for one hour. Next, 193.29 g of Pluracol P1010 was added, and finally the catalyst 0.15 g of dibutyl tin dilaurate was added. After observing the initial rise in temperature due to the corresponding exothermic reaction, the solution was brought to 80° C., whereupon that temperature was maintained for about two hours. Next, the presence of unreacted isocyanate groups (NCO) was measured once an hour until the amount of unreacted isocyanate groups was less than 0.10%.

Oligomer 1 Synthesis

To create Oligomer 1, all components are used in the ratios specified in Table 1B above. A 500 mL four-necked and dry flask was charged with 33.16 g of TDS and 0.92 g of stabilizer (BHT) to a reactor and maintained at ambient temperature while stirring under dry air. Next, 14.75 g of 2-HEA was added. Then, the reactive endcapper (2-HEA) was metered-in at such a rate so as to limit the reaction temperature to less than 60° C. The mixture was then stirred for one hour. Next, 250.96 g of Lupranol 1000 was added, and finally the catalyst 0.18 g of DBTDL was added. After observing the initial rise in temperature due to the corresponding exothermic reaction, the solution was brought to 60° C., whereupon that temperature was maintained for about two hours. Next, the presence of unreacted isocyanate groups (NCO) was measured once an hour until the amount of unreacted isocyanate groups was less than 0.05%.

Examples 1-2 and Comparative Examples 1-3

The formulations for Example 1 and Comparative Examples 1-2 were prepared from 99% SR 504 (ethoxylated nonyl phenol acrylate, Sartomer) and 1% photoinitiator. The cure profiles were recorded with FT-IR at various temperatures, the maximum rates and the normalized maximum rates (rate at T/rate at 25° C.) were determined, with the results shown below in Table 3A.

Example 2 and Comparative Example 3 were also prepared according to the reagents listed in Table 3A, with photoinitiator components added to ensure equivalent mole percentage in the entire formulation. The surface conversion of 50 mg of each formulation at 395 nm and 400 nm, further evaluated at 50° C. and 105° C., was conducted and measured according to the LED-DSC method described below, with the values reported in Table 3A.

Example 3 & Comparative Example 4

Figure 2:
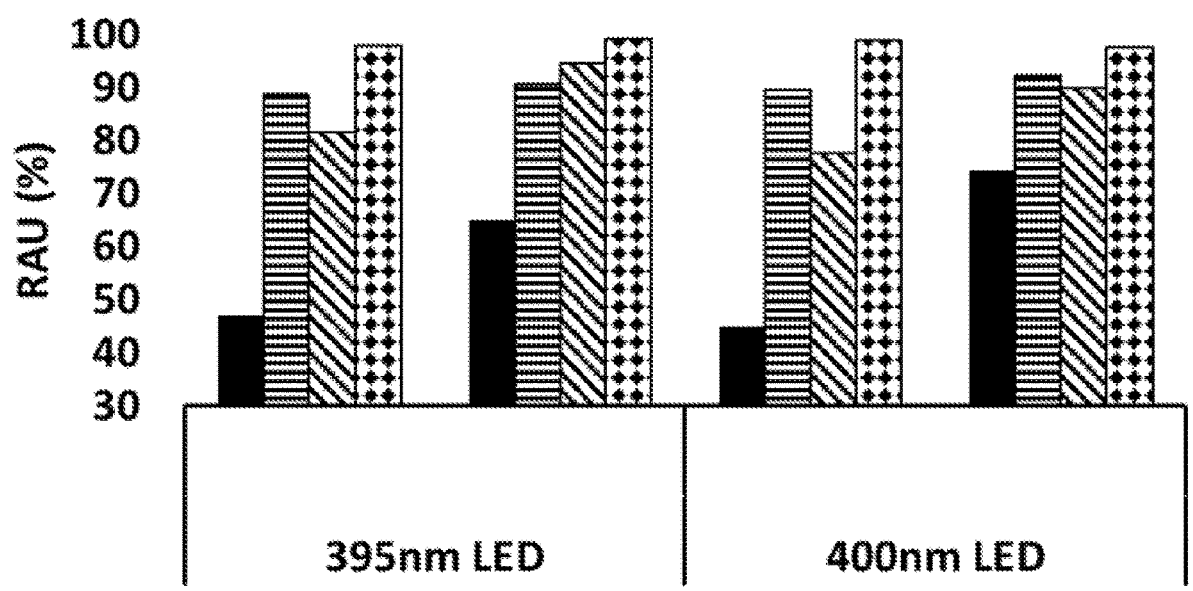
FIG. 2 depicts a graphical representation of the data shown in Table 3B comparing the relative cure performance of various clear secondary coating compositions under different curing wavelengths, temperatures, and film locations.

The formulations for Example 3 and Comparative Example 4 were prepared according to standard methods well-known in the art to which this invention applies using the ingredients in Tables 1A and 1B above, and the quantities listed in Table 3B below. The photoinitiator components were varied in weight, although this was done in order to ensure a consistent mole percentage across both formulations. The formulations were cured via the LED-DSC method described below under an inert atmosphere at two different temperatures and via light sources of two different peak wavelengths. The conversion at the film top and bottom was then measured for each sample for each test setup, with the results reported in Table 3B, and a graphical depiction in FIG. 2. Turing to FIG. 2, there are four sets of graphs; one for Example 3 and another for Comparative Example 4 when tested under 395 nm and 400 nm cure conditions. From left to right, the first and third set of graphs correspond to Comparative Example 4, while the second and fourth set correspond to Example 3. For each set of graphs, the bar in solid color represents the cure performance at the surface of the respective sample's film when cured at 50° C. The bar with horizontal lines represents the cure performance at the surface of the sample when cured at 105° C. Similarly, the bars with diagonal lines represent cure performance of the bottom of the films at 50° C. Finally, the bars with a diamond pattern represent cure performance at the top of each sample when cured at 105° C.

Example 4 & Comparative Example 5

Figure 3:
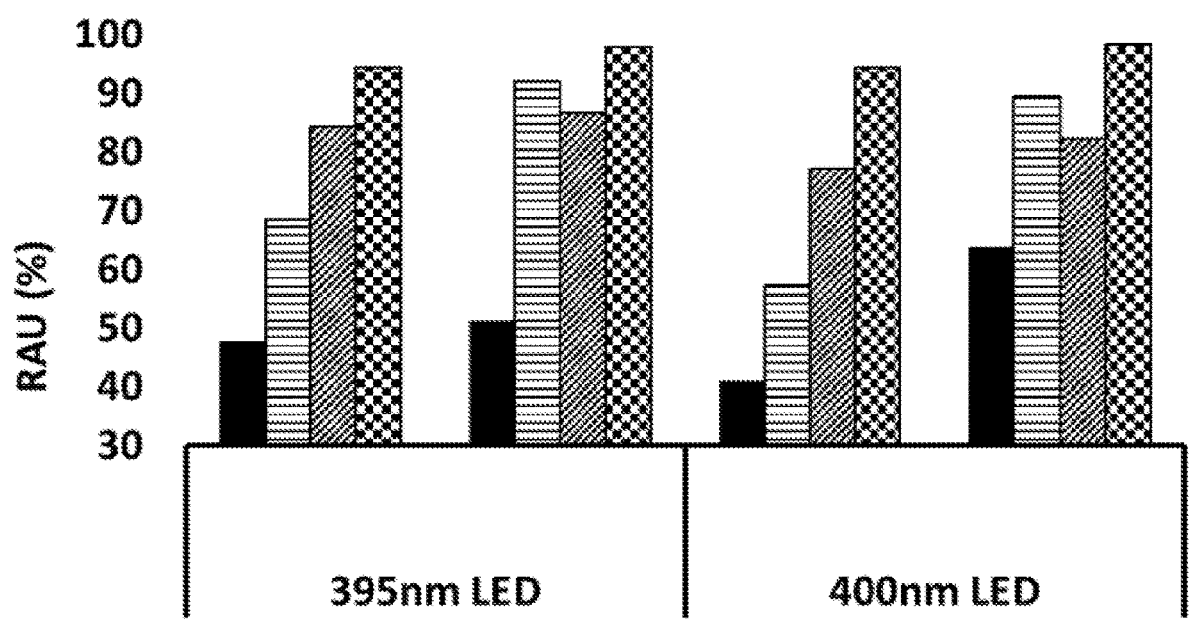
FIG. 3 depicts a graphical representation of the data shown in Table 3C comparing the relative cure performance of various colored secondary coating compositions under different curing wavelengths, temperatures, and film locations.

The formulations for Example 4 and Comparative Example 5 were prepared according to standard methods well-known in the art to which this invention applies using the ingredients in Tables 1a and 1b above, and the quantities listed in Table 3C below. The formulations were cured via the LED-DSC method described below under an inert atmosphere at two different temperatures and via light sources of two different peak wavelengths. The conversion at the film top and bottom was then measured for each sample for each test setup, with the results reported in Table 3C, and a graphical depiction in FIG. 3. Turing to FIG. 3, there are four sets of graphs; one for Example 4 and another for Comparative Example 5 when tested under 395 nm and 400 nm cure conditions. From left to right, the first and third set of graphs correspond to Comparative Example 5, while the second and fourth set correspond to Example 4. For each set of graphs, the bar in solid color represents the cure performance at the surface of the respective sample's film when cured at 50° C. The bar with horizontal lines represents the cure performance at the surface of the sample when cured at 105° C. Similarly, the bars with diagonal lines represent cure performance of the bottom of the films at 50° C. Finally, the bars with a checkered pattern represent cure performance at the top of each sample when cured at 105° C.

Normalized and Maximum Rate of Polymerization via RT-FTIR

The samples were measured with a Bruker Vertex 70 FT-IR spectrometer equipped with a rapid scan device, a PIKE technologies GladiATR ATR accessory and a highly sensitive MCT detector. The UV illumination necessary for sample curing was done using a Dr. Honle UV lamp (D-bulb) which was allowed to warm up by running the lamp 30 minutes prior to the first test. A Quartz light guide (i.d. 3.0 mm) was coupled to the lamp in order to shine the UV light on the samples.

Measurement was taken as follows. Before the start of each curing experiment the light density on the sampling spot was measured using a Solatell Solascope UV spectrometer. The intensity was set to 20 mW/cm$^2$, with the distance from the light guide to the sample fixed in the same position by the stock holder in the device. The liquid sample thickness, which was applied to the entire surface area of the ATR assembly, was maintained at approximately 30 μm.

An IR spectrum of the uncured sample was recorded by applying a resolution of 4 cm$^{-1}$ while averaging 100 scans. For the curing measurement the sample was UV-illuminated with constant intensity. The IR measurements were started simultaneously with the illumination. In the initial phase, an IR spectrum was recorded every 0.07 seconds. After this initial period (approximately 8 seconds), the number of spectra to be averaged was increased to 100 leading to a sampling frequency of one measurement point per four seconds. At the end of every curing cycle, an IR spectrum was recorded using the same conditions as for the uncured sample.

The cure profile of each of Example 1, Comparative Example 1, and Comparative Example 2 was recorded with FT-IR in steps of 25° C.; from these plots the maximum rates were determined by extracting the steepest slope. These values were then plotted as a function of temperature and depicted in FIG. 1. Turning to FIG. 1, the experimentally-observed data points for Example 1 appears as triangles, with the applied curve-fit (using the exponential fit from Microsoft Excel) of the data points depicted as a solid line. The experimentally-observed data points for Comparative Example 1 appear as circles, with the applied curve-fit of the data points depicted as a dotted line. Finally, the experimentally-observed data points for Comparative Example 2 appear as diamonds, with the applied curve-fit of the data points depicted as a dashed line.

Data analysis was performed as described in Macromolecules 37, 2275 (2004) at [005] et seq. Both the maximum rate of polymerization, as well as the normalized maximum rate of polymerization (rate at T/rate at 25° C.) at three different temperatures (25° C., 100° C., and 150° C.) were determined and listed in Table 3 as "Max rate" and "Normalized max rate," respectively.

Conversion; LED-DSC Method

A method of LED-DSC is described below using a photo-DSC equipped with a LED lamp to cure coating samples for cure degree measurements. As coating processes utilizing monochromatic light sources (such as LEDs) are more prone to oxygen inhibition, the surface cure degree is particularly sensitive to the O$_2$ content in the N$_2$ purged air condition during the cure. The commonly used conveyer belt equipment for preparing regular film samples suffers from large variations on surface cure due to the difficulty of precisely controlling the O$_2$ content in the associated open environment. The LED-DSC method as described below utilizing a photo-DSC equipment is superior in this respect in that it provides much better control with regards to atmospheric conditions in the sample chamber. This results in coating surface cure degree data wither levels of accuracy, repeatability and reproducibility.

Figure 4:
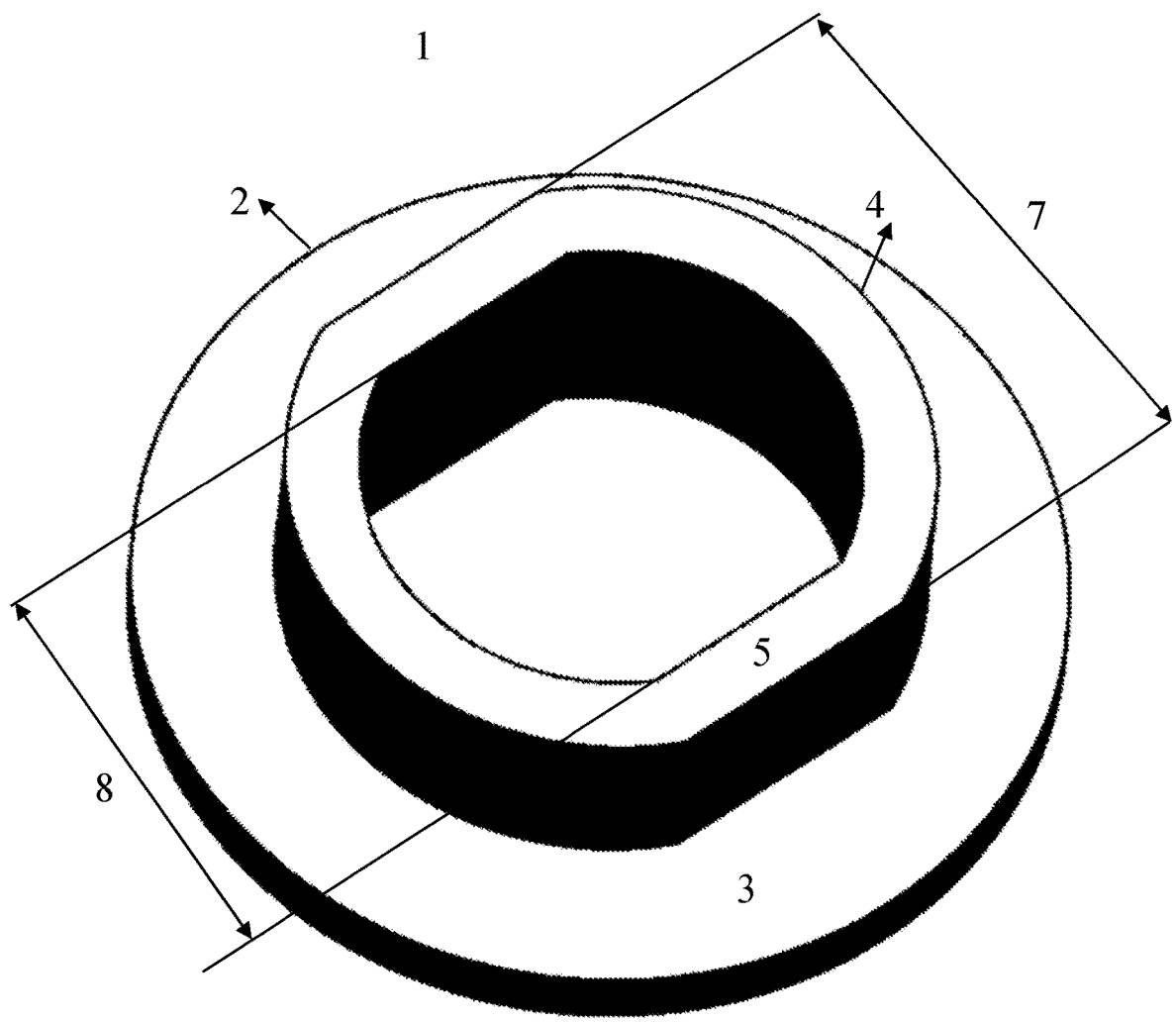
FIG. 4 illustrates the dimensions and geometry of the custom lamp holder utilized in the LED-DSC method described in the experiments herein.

Preparation of the Cured Film Samples from the LED-DSC Unit: a specified amount of each sample (as denoted below) was dropped at the center of a T130522 DSC Tzero pan. The pan was then moved onto the sample plate of a Q2000 DSC unit from TA Instruments. A lamp holder for the DSC unit was customized and built according to well-known methods from Somos® NanoTool stereolithography resin in order to ensure proper fit of the lamps used (Accucure ULM-2-395 or ULM-2-400 model LED lamps from Digital Light Labs for conversion at 395 nm and 400 nm, respectively). The precise dimensions of the lamp, which could be alternatively fashioned from any suitable material via any other known method, such as injection molding or CNC methods. is depicted in FIG. 4. Turning to FIG. 4, the lamp holder 1 has a circular base 2 possessing an outside diameter of 2.47 inches, and a planar first face 3 having a height of 0.21 inches. A chamfered circular upper boss 4 having an outside diameter of 1.71 inches and an inside diameter of 1.36 inches is concentric with the circular base 2, with the exception that the parallel chamfered portions as depicted possess an outside distance 7 of 1.54 inches and an inside distance 8 of 1.20 inches. The circular upper boss 4 further possesses a planar second face 5 having a height relative to the planar first face 3 of 0.55 inches, whereupon planar first face 3 and planar second face 5 are co-planar.

The bottom portion of the custom lamp holder described above possessed the same geometry as the "stock" photo-DSC holder, but the top of holder was custom designed to match the LED lamp head used. This LED lamp emitted a flood area of light, but passed through two holes of the sample cover and exposed light on both the sample pan and reference pan. Therefore, the customized lamp holder fixed the distance between the lamp and sample/reference pans, ensuring that the exposure area was fixed as well by aligning lamp with the two holes on the sample cover as well as both the sample pan and reference pan.

The included LED external shutter was automatically triggered by connecting the "Event" outlet of the DSC to an Accure Photo Rheometer Ultraviolet Illumination & Measurement System or LED exposure control system. The "Event" outlet of the Photo-DSC was connected to the cooling system and triggered the cooling system as needed. Here, it connected to the LED exposure control system to trigger LED light automatically. The light exposure time was controlled by the "on" or "off" event to maximize the precision of the light exposure time, as well as the ability to automatically exert control while the light intensity was preset over the LED exposure control system.

Each liquid sample was gradually and uniformly wetted out to establish a film with a defined thickness in the pan. These films were then cured by the LED lamp. The intensity of light and exposure time could be adjusted by the Accure Photo Rheometer Ultraviolet Illumination & Measurement System, while the curing temperature and $N_2$ flow rate could be adjusted by the DSC unit. Under an $N_2$ flow rate of approximately 50 mL/min, each sample was equilibrated at the specified temperature (50° C. or 105° C., depending on the test used) and isothermalized for approximately 5 mins, after which a 395 nm or 400 nm (depending on test used) LED lamp with a specified intensity was illuminated and remained on for a specified time period. Next, the cured sample was isothermalized for another 2 minutes. For the primary coatings exhibited in Table 3A, about 50 mg of the liquid sample was cured in a DSC aluminate pan by exposing it to 10 mW/cm$^2$ of 395 nm or 400 nm LED light (depending on the experiment, as indicated in Table 3A) for 3 seconds. For the clear and colored secondary coatings described in Tables 3B and 3C, meanwhile, about 1.5 mg of each liquid sample was cured in a DSC aluminate pan by exposing it to 50 mW/cm$^2$ of 395 nm or 400 nm LED light (where indicated in Tables 3B or 3C) for 9 seconds. The cured film was then carefully peeled off from the bottom of Tzero pan. Finally, the surface (and/or bottom, where relevant) of the cured film was measured, and the conversion was calculated as per the FTIR test method described herein.

Measurement of Surface and Bottom Cure of Film Samples by FTIR: The surface of the cured film was measured with ATR using a Nicolet 4700 FTIR Spectrometer from Thermo Electron Corp. Measurements were taken at the area under the reference peak from about 1485 cm$^{-1}$ to about 1570 cm$^{-1}$; the acrylate peak at approximately 1407 cm$^{-1}$ was also measured. Peak area is determined using the baseline technique where a baseline is chosen to be tangent to absorbance minima on either side of the peak. The area under the peak and above the baseline is then determined. The integration limits for liquid and the cured sample are not identical but are similar, especially for the reference peak.

The ratio of the acrylate peak area to the reference peak were determined for both the liquid and the cured samples. Degree of cure, expressed as percent reacted acrylate unsaturation (% RAU), is calculated from the equation below:

$$\% \text{ RAU}=[(R_L-R_F)\times 100]/R_L$$

where $R_L$ is the area ratio of the liquid sample and $R_F$ is the area ratio of the cured film.

The resulting coatings on film % RAU were tested using the FTIR method described as above and are shown in Table 3 below.

It should be noted that the % RAU of the film samples cured by the LED-DSC method is expected to be substantially lower than the actual secondary coating surface cure on fiber under typical fiber drawing conditions cured by LED lamps. First, this occurs because the LED lamps utilized in actual draw towers for coating optical fibers possess a significantly higher output intensity than the one used on LED-DSC unit. Also, the LED lamps which are custom-designed for fiber drawing processes are highly focused on small areas of an optical fiber therefore providing much higher irradiance than the lamp condition used in LED-DSC. However, the relative trend of % RAU results of the series of film samples as shown in Table 3 are expected to correlate well with the in-situ cure degree of coatings on fiber. The LED-DSC method is therefore a reliable laboratory test that can be used as an accurate proxy to predict the relative trend of primary and secondary coating cure on fiber by typical fiber drawing processes equipped with LED lamps.

Calculation of Ionization Potentials

The procedure herein was used to derive all ionization potential values. First, the molecular structure of the system of interest was constructed by means of the Spartan 14 software (Spartan '14 Version 1.1.2 Oct. 24, 2013, Copyright©1991-2013 by Wavefunction Inc). Using the same program, a conformational analysis was conducted employing the Merck Molecular Force Field (MMFF). All MMFF conformations were subsequently minimized using the semi-empirical Parameterization Method 6 (PM6).

All unique conformations resulting from the PM6 optimization runs were exported as .xyz coordinate files which were then used as a starting point to conduct more advanced quantum mechanical calculations at the B3LYP/6-31G(d)

level with the Gaussian 09 program (Gaussian 09, Revision C.01, M. J. Frisch, G. W. Trucks, et al., Gaussian, Inc., Wallingford CT, 2010). The spin-unrestricted wavefunctions for both the radicals and triplet states were then calculated.

All optimization runs were followed by unrestricted B3LYP/6-31G(d) frequency calculations in order to identify whether or not the resulting B3LYP/6-31G(d) structures were true energy minima on the potential energy surface.

The ionization potential (IP) was derived from the results for the global minimum conformation under the assumption of Koopmans' theorem, i.e., the IP were obtained from the energy of the highest occupied molecular orbital (HOMO) as $P = -\varepsilon_{HOMO}$ with the HOMO energies converted from a.u. (Hartree) to electron volts (1 Hartree=27.211383 eV). Values are expressed in terms of electron volts (eV).

The ionization potentials of the triplet states of several known Norrish Type I photoinitiators calculated according to this method are presented below in Table 2.

TABLE 2

Calculated Triplet State Ionization Potential of Norrish Type I Cleavage Initiators

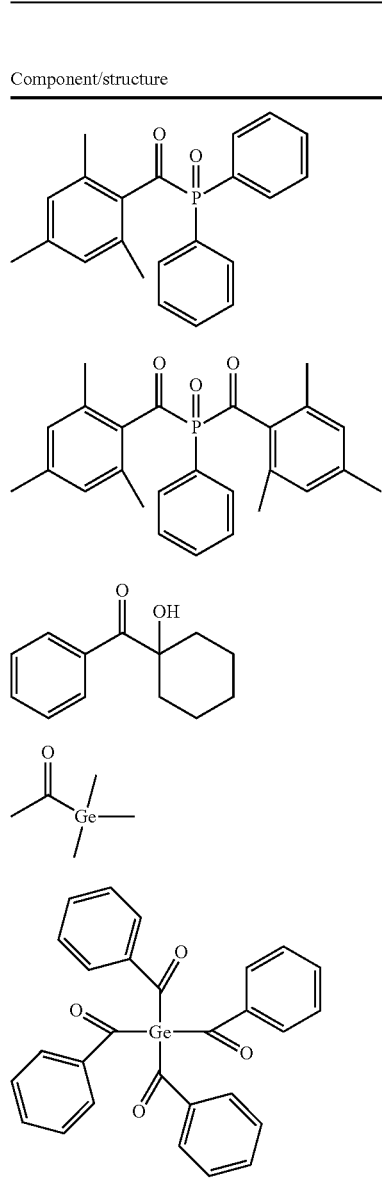

| Component/structure | Value (in electron volts) |
|---|---|
| (structure 1) | 4.15 |
| (structure 2) | 3.98 |
| (structure 3) | 3.91 |
| (structure 4) | 3.88 |
| (structure 5) | 3.88 |

TABLE 2-continued

Calculated Triplet State Ionization Potential of Norrish Type I Cleavage Initiators

| Component/structure | Value (in electron volts) |
|---|---|
| (structure 6) | 3.87 |
| (structure 7) | 3.86 |
| (structure 8) | 3.71 |
| (structure 9) | 3.62 |
| (structure 10) | 3.50 |
| (structure 11) | 3.49 |

TABLE 3A

Primary coating compositions. Examples 1-2 and Comparative Examples 1-3. Amounts are listed in parts by weight.

| Example | C. 1 | C. 2 | 1 | C. 3 | 2 |
|---|---|---|---|---|---|
| Oligomer 1 | | | | 60.00 | 60.00 |
| SR306 | | | | 1.00 | 1.00 |
| SR504 | 99.00 | 99.00 | 99.00 | 27.00 | 27.02 |
| SR339 | | | | 10.00 | 10.00 |
| Irganox 1035 | | | | 0.50 | 0.50 |
| Silquest A-189 | | | | 1.00 | 1.00 |
| BAPO | | 1.00 | | 0.50 | |
| TPO | 1.00 | | | | |
| BAG | | | 1.00 | | 0.48 |
| TOTALS | 100.00 | 100.00 | 100.00 | 100.00 | 100.00 |
| Calculated Ionization Potential of photoinitiator (eV) | 4.15 | 3.98 | 3.49 | 3.98 | 3.49 |
| Max rate (mmol/kg sec) @ 25° C. | 26 | 39 | 25 | | |
| Max rate (mmol/kg sec) @ 100° C. | 11 | 15 | 19 | | |
| Max rate (mmol/kg sec) @ 150° C. | 8 | 9 | 18 | | |
| Normalized max rate @ 25° C. | 1 | 1 | 1 | | |
| Normalized max rate @ 100° C. | 0.44 | 0.38 | 0.76 | | |
| Normalized max rate @ 150° C. | 0.31 | 0.24 | 0.73 | | |
| 395 nm LED @ 50° C.; Film Surface (RAU %) | | | | 54.83 | 66.67 |
| 395 nm LED @ 105° C.; Film Surface (RAU %) | | | | 41.12 | 59.22 |
| Film Surface Cure Ratio, 105° C./50° C. (395 nm) | | | | 0.75 | 0.89 |
| 400 nm LED @ 50° C.; Film Surface (RAU %) | | | | 60.62 | 61.89 |
| 400 nm LED @ 105° C.; Film Surface (RAU %) | | | | 39.98 | 63.17 |
| Film Surface Cure Ratio, 105° C./50° C. (400 nm) | | | | 0.66 | 1.02 |

TABLE 3B

Clear secondary coating compositions. Amounts are listed in parts by weight.

| Example | C. 4 | 3 |
|---|---|---|
| Oligomer A | 30.00 | 30.00 |
| CN120Z | 40.00 | 40.00 |
| SR306 | 30.50 | 30.58 |
| SR339 | 2.00 | 2.00 |
| Irganox 1035 | 0.50 | 0.50 |
| BAPO | 2.00 | |
| BAG | | 1.92 |
| DOWSIL 57 | 0.20 | 0.20 |
| DOWSIL 190 | 0.40 | 0.40 |
| TOTALS | 105.60 | 105.60 |
| Calculated Ionization Potential of Photoinitiator (eV) | 3.98 | 3.49 |
| 395 nm LED @ 50° C.; Film Surface (RAU %) | 47.00 | 64.83 |
| 395 nm LED @ 50° C.; Film Bottom (RAU %) | 88.78 | 90.50 |
| 395 nm LED @ 105° C.; Film Surface (RAU %) | 81.62 | 94.73 |
| 395 nm LED @ 105° C.; Film Bottom (RAU %) | 97.93 | 99.20 |
| 400 nm LED @ 50° C.; Film Surface (RAU %) | 44.84 | 74.23 |
| 400 nm LED @ 50° C.; Film Bottom (RAU %) | 89.58 | 92.28 |
| 400 nm LED @ 105° C.; Film Surface (RAU %) | 77.42 | 89.91 |
| 400 nm LED @ 105° C.; Film Bottom (RAU %) | 98.83 | 97.46 |

TABLE 3C

Colored secondary compositions. Amounts are listed in parts by weight.

| Example | C. 5 | 4 |
|---|---|---|
| Oligomer A | 30.00 | 30.00 |
| CN120Z | 40.00 | 40.00 |
| SR306 | 25.50 | 25.58 |
| SR339 | 2.00 | 2.00 |
| Irganox 1035 | 0.50 | 0.50 |
| BAPO | 2.00 | |
| BAG | | 1.92 |
| Yellow Dispersion | 5.00 | 5.00 |
| DOWSIL 57 | 0.20 | 0.20 |
| DOWSIL 190 | 0.40 | 0.40 |
| TOTALS | 105.60 | 105.60 |
| Calculated Ionization Potential of Photoinitiator (eV) | 4.15 | 3.49 |
| 395 nm LED @ 50° C.; Film Surface (RAU %) | 47.64 | 51.19 |
| 395 nm LED @ 50° C.; Film Bottom (RAU %) | 84.35 | 86.57 |
| 395 nm LED @ 105° C.; Film Surface (RAU %) | 68.40 | 91.90 |
| 395 nm LED @ 105° C.; Film Bottom (RAU %) | 94.35 | 97.85 |
| 400 nm LED @ 50° C.; Film Surface (RAU %) | 40.90 | 63.87 |
| 400 nm LED @ 50° C.; Film Bottom (RAU %) | 77.08 | 82.06 |
| 400 nm LED @ 105° C.; Film Surface (RAU %) | 57.17 | 89.40 |
| 400 nm LED @ 105° C.; Film Bottom (RAU %) | 94.17 | 98.25 |

Discussion of Results

The above Tables demonstrate that when a composition according to the present invention is employed, some resulting cure properties are superior across a number of different cure temperatures, locations along a given coating (i.e. surface or bottom), and exposure wavelengths. This is evident from the primary coating compositions formulated in Table 3A, wherein despite the fact that example 1 shows similar maximum conversion rate to its corresponding comparative example at room temperature, it maintains a better efficiency at elevated temperatures. This is shown by the fact that example 1 exhibits a normalized maximum rate at 150° C. that is more than double that of the comparative examples. This effect is similarly shown across the film surface cure ratio, wherein example 2 outperforms comparative example 3 at both 395 nm and 400 nm.

Tables 3B and 3C show that secondary coating compositions can also exhibit this improved effect. There, clear secondary example 3 outperforms comparative example 4, and colored secondary 4 outperforms comparative example 5, in terms of RAU % at both film surface and bottom under two different cure wavelengths (again 395 nm and 400 nm). The effect is most pronounced at film surface, wherein a high degree of surface cure is important to prevent issues on the outward-facing coating from sticking together during winding of the coated optical fiber.

Additional Exemplary Embodiments

Disclosed herein are further alternative exemplary embodiments. A first aspect of a first additional exemplary embodiment is a radiation curable composition for coating an optical fiber comprising:
a urethane acrylate oligomer which is the reaction product of an isocyanate, a polyol, and a (meth)acrylate monomer;
a reactive diluent monomer;
optionally, one or more additives; and
a Norrish Type I photoinitiator; wherein the Norrish Type I photoinitiator possesses a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=-$\varepsilon_{HOMO}$).

An additional aspect of a first additional exemplary embodiment is a radiation curable composition for coating an optical fiber comprising:
a urethane acrylate oligomer which is the reaction product of an isocyanate, a polyol, and a (meth)acrylate monomer;
a reactive diluent monomer;
optionally, one or more additives; and
a Norrish Type I photoinitiator; wherein the Norrish Type I photoinitiator possesses a normalized rate of polymerization at 150 degrees Celsius (° C.) of greater than 0.5 and up to 1.0, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the Norrish Type I photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm².

An additional aspect of a first additional exemplary embodiment is a radiation curable composition for coating an optical fiber comprising:
a urethane acrylate oligomer which is the reaction product of an isocyanate, a polyol, and a (meth)acrylate monomer;
a reactive diluent monomer;
optionally, one or more additives; and
a Norrish Type I photoinitiator; wherein the Norrish Type I photoinitiator comprises an acylgermanium compound.

Another aspect of the first additional exemplary embodiment is the composition according to any of the previous aspects, wherein the radiation curable composition is substantially free from a pigment,
or wherein, relative to the weight of the entire composition, the pigment is present in an amount less than 0.05 wt. %, or less than 0.01 wt. %, or less than 0.005 wt. %.

Another aspect of the first alternative exemplary embodiment is the composition according to any of the previous aspects, wherein the composition is substantially free from an acyl phosphine oxide photoinitiator.

Another aspect of the first additional exemplary embodiment is the composition according to any of the previous aspects, wherein the composition is a primary coating composition further comprising an adhesion promoter, and wherein, relative to the weight of the entire composition:
the urethane acrylate oligomer is present from 40 wt. % to 90 wt. %;
the reactive diluent monomer is present from 5 wt. % to 60 wt. %;
the additives are present from 0 wt. % to 40 wt. %; and
the Norrish Type I photoinitiator is present from 0.005 wt. % to 5 wt. %.

Another aspect of the first additional exemplary embodiment is the composition according to any of the previous aspects, wherein the composition is a secondary coating composition and wherein, relative to the weight of the entire composition:
the urethane acrylate oligomer is present from 10 wt. % to 85 wt. %;
the reactive diluent monomer further comprises
a monofunctional ethylenically unsaturated compound which is present from 0 wt. % to 20 wt. %, and
a multifunctional ethylenically unsaturated compound which is present from 10 wt. % to 75 wt. %;
the additives are present from 0 wt. % to 40 wt. %; and
the Norrish Type I photoinitiator is present from 0.005 wt. % to 5 wt. %.

Another aspect of the first additional exemplary embodiment is the composition according to any of the previous aspects, wherein the urethane acrylate oligomer possesses an average from 0.8 to 2.2 polymerizable groups, or an average from 1.8 to 2.2 polymerizable groups, and wherein the polyol comprises polypropylene glycol.

Another aspect of the first additional exemplary embodiment is the composition according to any of the previous aspects, wherein the Norrish Type I photoinitiator comprises an acylgermanium compound possessing a structure in accordance with the following formula (I):

in which $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups;

further wherein one of the following conditions is satisfied:
(a) each of $R_1$-$R_3$ is an aryl-substituted or aromatic acyl group; or
(b) if exactly two of $R_1$-$R_3$ are an aryl-substituted or aromatic acyl group, the remaining substituted groups are a $C_1$-$C_{10}$ aryl; or
(c) if exactly one of $R_1$-$R_3$ is an aryl-substituted or aromatic acyl group, the remaining two substituted groups are a $C_1$-$C_{10}$ aryl; or
(d) each of $R_1$-$R_3$ is a $C_1$-$C_{10}$ aryl.

Another aspect of the first additional exemplary embodiment is the composition according to any of the previous aspects, wherein the Norrish Type I photoinitiator comprises at least 80% by weight, relative to the entire weight of all Norrish Type I photoinitiators present in the composition, of one or both of the following compounds:

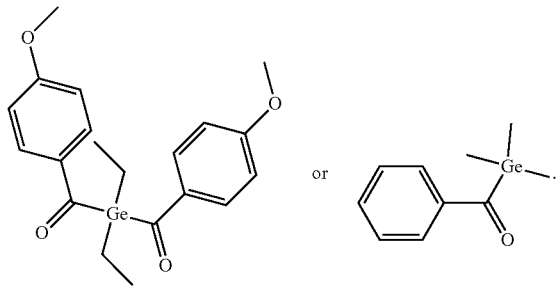

A first aspect of a second additional exemplary embodiment is a method for producing a coated optical fiber comprising the steps of:
(a) drawing a glass optical fiber through a draw tower;
(b) applying a primary coating composition onto the surface of the glass optical fiber;
(c) optionally, imparting a dose of UV light to at least partially cure said primary coating composition;
(d) applying a secondary coating composition to the primary coating composition;
(e) exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating;
wherein at least one of the primary coating composition or the secondary coating composition comprises a reactive oligomer comprising an average of at least one polymerizable group;
a monomer comprising an average of at least one polymerizable group; and
a photoinitiator;
wherein the photoinitiator possesses a normalized rate of polymerization at 150° C. of greater than 0.5, or greater than 0.6, or greater than 0.7, or between 0.35 and 0.9, or between 0.35 and 0.8, or from 0.35 to 0.75, or from 0.4 to 0.8, or from 0.4 to 0.75, or from 0.5 to 0.8, or from 0.5 to 0.75, or from 0.6 to 0.8, or from 0.6 to 0.75, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the photoinitiator and 99 parts by weight of ethoxylated nonylphenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm$^2$.

Another aspect of the second additional exemplary embodiment is a method for producing a coated optical fiber comprising the steps of:
(a) drawing a glass optical fiber through a draw tower;
(b) applying a primary coating composition onto the surface of the glass optical fiber;
(c) optionally, imparting a dose of UV light to at least partially cure said primary coating composition;
(d) applying a secondary coating composition to the primary coating composition;
(e) exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating;
wherein at least one of the primary coating composition or the secondary coating composition comprises a reactive oligomer comprising an average of at least one polymerizable group;
a monomer comprising an average of at least one polymerizable group; and
a photoinitiator;
wherein the photoinitiator possesses a potential excited triplet state with an ionization potential from 3.0 electron volts (eV) to 3.90 eV, or from 3.1 eV to 3.88 eV, or from 3.1 eV to 3.87 eV, or from 3.1 eV to 3.86 eV, or from 3.15 eV to 3.80 eV, or from 3.15 eV to 3.50 eV, or from 3.2 eV to 3.75 eV, wherein the ionization potential is calculated in accordance with molecular modeling B3LYP/6-31G(d) in combination with Koopman's Theorem (IP=$-\varepsilon_{HOMO}$).

Another aspect of the second additional exemplary embodiment is the method according to any of the previous aspects, wherein the radiation source capable of emitting ultraviolet radiation to affect curing of said primary coating composition and said secondary coating composition comprises, consists essentially of, or consists of one or more LEDs; wherein the one or more LEDs emit actinic radiation with a peak spectral output from 375 nm to 450 nm, or from 375 nm to 410 nm, or from 380 nm to 405 nm, or from 390 nm to 400 nm.

Another aspect of the second additional exemplary embodiment is the method according to any of the previous aspects, wherein the photoinitiator which comprises a compound that is alkyl-, aryl-, or acyl-substituted, wherein the alkyl-, aryl-, or acyl-substituted compound also possesses an atom selected from the group consisting of silicon, germanium, tin, and lead.

Another aspect of the second additional exemplary embodiment is the method according to any of the previous aspects, wherein the photoinitiator comprises an acylgermanium compound.

Another aspect of the second alternative exemplary embodiment is the method according to any of the previous aspects, wherein the photoinitiator comprises an acylgermanium compound possessing a structure in accordance with the following formula (I):

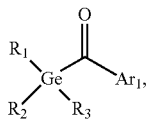
(I)

in which $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups.

Another aspect of the second additional exemplary embodiment is the method according to any of the previous aspects, wherein the primary coating composition further comprises an additive component and wherein, relative to the weight of the entire composition:
　the reactive oligomer comprising an average of at least one polymerizable group is present from 40 wt. % to 80 wt. %;
　the monomer comprising an average of at least one polymerizable group is present from 10 wt. % to 60 wt. %;
　the additive component is present from 0 wt. % to 40 wt. % and further comprises a glass adhesion promoter; and
　the photoinitiator is present from 0.005 wt. % to 5 wt. %.

Another aspect of the second additional exemplary embodiment is the method according to any of the previous aspects, wherein the secondary coating composition further comprises an additive component and wherein, relative to the weight of the entire composition:
　the reactive oligomer comprising an average of at least one polymerizable group is present from 10 wt. % to 80 wt. %;
　the monomer comprising an average of at least one polymerizable group is present from 10 wt. % to 60 wt. %, wherein the monomer further comprises a monofunctional ethylenically unsaturated compound and a multifunctional ethylenically unsaturated compound;
　the additive component is present from 0 wt. % to 40 wt. %; and
　the photoinitiator is present from 0.005 wt. % to 5 wt. %.

Another aspect of the second additional exemplary embodiment is the method according to any of the previous aspects, wherein
　the additive component of the secondary coating composition further comprises a pigment; and/or
　the multifunctional ethylenically unsaturated compound comprises bisphenol A diacrylate.

Another aspect of the second additional embodiment is the method according to any of the previous aspects, wherein the photoinitiator, when incorporated in a 1.5 mg mixture of the secondary coating composition comprising 4.8 mmol by weight of the photoinitiator, and when cured and measured according to an LED-DSC method at 105° C. and utilizing a 400 nm LED light source, exhibits film surface degree of cure, as expressed as percent reacted acrylate unsaturation (% RAU) of at least 60%, or at least 65%, or at least 75%, or at least 80%, or at least 85%, or from 60 to 95%, or from 70 to 95%, or from 75 to 92%, or from 80 to 91%.

Another aspect of the second additional exemplary embodiment is the method according to any of the previous aspects, wherein the drawing occurs under one of the following conditions:
　at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min; or
　under the application of no helium, or the application of helium at a flow rate of less than 20 standard liters per minute (SLM), or less than 10 SLM, or less than 5 SLM, or from 1 to 20 SLM, or from 1 to 10 SLM, or from 1 to 5 SLM, or from 5 to 20 SLM, or from 5 to 10 SLM.

A first aspect of a third additional exemplary embodiment is a coated optical fiber produced by the method of any of the aspects of the second additional exemplary embodiment and/or any of the compositions of the first additional exemplary embodiment.

Another aspect of the third additional exemplary embodiment is the coated optical fiber of the previous aspect of the third additional exemplary embodiment, wherein the coated optical fiber possesses a mode-field diameter from 8 to 10 µm at a wavelength of 1310 nm, or a mode-field diameter from 9 to 13 µm at a wavelength of 1550 nm, and/or an effective area between 20 and 200 µm².

A first aspect of a fourth additional exemplary embodiment is an optical fiber cable comprising a plurality of coated optical fibers disposed within at least a portion of the cable, wherein at least one of the plurality of coated optical fibers is the coated optical fiber according to any of the aspects of the third additional exemplary embodiment, a coated optical fiber produced by any of the methods of any of the aspects of the second additional exemplary embodiment, and/or is the cured product of any of the radiation curable compositions of any of the aspects of the first additional exemplary embodiment.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

20. The composition of claim 19, wherein the Norrish Type I photoinitiator comprises at least 80% by weight, relative to the entire weight of all Norrish Type I photoinitiators present in the composition, of one or both of the following compounds:
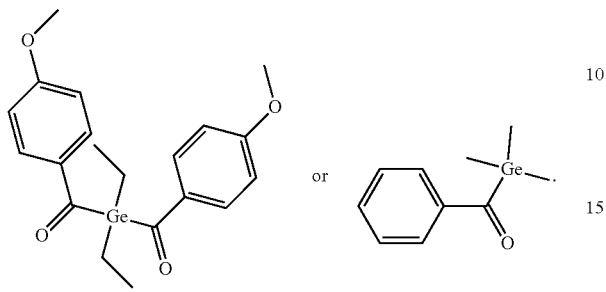

What is claimed is:

1. A method for producing a coated optical fiber comprising the steps of:
    (a) drawing a glass optical fiber through a draw tower;
    (b) applying a primary coating composition onto the surface of the glass optical fiber;
    (c) optionally, imparting a dose of UV light to at least partially cure said primary coating composition;
    (d) applying a secondary coating composition to the primary coating composition;
    (e) exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating;
    wherein at least one of the primary coating composition or the secondary coating composition comprises a reactive oligomer comprising an average of at least one polymerizable group;
    a monomer comprising an average of at least one polymerizable group; and
    a photoinitiator;
    wherein the photoinitiator possesses
    (i) a normalized rate of polymerization at 150° C. of greater than 0.5, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm²; or
    (ii) a potential excited triplet state with an ionization potential from 3.0 electron volts (eV) to 3.90 eV,
    wherein the ionization potential is calculated in accordance with molecular modeling B3LYP/6-31G(d) in combination with Koopman's Theorem (IP=$-\varepsilon_{HOMO}$).

2. The method according to claim 1, wherein the radiation source capable of emitting ultraviolet radiation to affect curing of said primary coating composition and said secondary coating composition comprises, consists essentially of, or consists of one or more LEDs; wherein the one or more LEDs emit actinic radiation with a peak spectral output from 375 nm to 450 nm.

3. The method according to claim 1, wherein the photoinitiator which comprises a compound that is alkyl-, aryl-, or acyl-substituted, wherein the alkyl-, aryl-, or acyl-substituted compound also possesses an atom selected from the group consisting of silicon, germanium, tin, and lead.

4. The method according to claim 1, wherein the photoinitiator comprises an acylgermanium compound.

5. The method according to claim 4, wherein the secondary coating composition comprises, relative to the weight of the entire composition:
    from 10 wt. % to 80 wt. % of the reactive oligomer comprising an average of at least one polymerizable group;
    from 10 wt. % to 60 wt. % of the monomer comprising an average of at least one polymerizable group, wherein the monomer further comprises a monofunctional ethylenically unsaturated compound and a multifunctional ethylenically unsaturated compound;
    from greater than 0 wt. % to 40 wt. % of the additive component; and
    from 0.005 wt. % to 5 wt. % the photoinitiator.

6. The method according to claim 5, wherein the additive component of the secondary coating composition further comprises a pigment; and/or the multifunctional ethylenically unsaturated compound comprises bisphenol A diacrylate.

7. The method according to claim 1, wherein the photoinitiator comprises an acylgermanium compound possessing a structure in accordance with the following formula (I):

in which $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups.

8. The method according to claim 1, wherein the primary coating composition comprises, relative to the weight of the entire composition:

from 40 wt. % to 80 wt. % of the reactive oligomer comprising an average of at least one polymerizable group;
from 10 wt. % to 60 wt. % of the monomer comprising an average of at least one polymerizable group;
from 0 wt. % to 40 wt. % of the additive component;
from 0.005 wt. % to 5 wt. % of the photoinitiator;
wherein the composition further comprises a glass adhesion promoter.

9. The method according to claim 1, wherein the photoinitiator, when incorporated in a 1.5 mg mixture of the secondary coating composition comprising 4.8 mmol by weight of the photoinitiator, and when cured and measured according to an LED-DSC method at 105° C. and utilizing a 400 nm LED light source, exhibits film surface degree of cure, as expressed as percent reacted acrylate unsaturation (% RAU) of at least 60%.

10. The method according to claim 1, wherein the drawing occurs under one of the following conditions:
at a draw speed of greater than 2000 m/min; or
under the application of helium at a flow rate of less than 20 standard liters per minute (SLM).

11. The method according to claim 1, wherein the normalized rate of polymerization at 150° C. is between 0.5 and 0.9.

12. The method according to claim 1, wherein the photoinitiator possesses a potential excited triplet state with an ionization potential from 3.0 electron volts (eV) to 3.90 eV, wherein the ionization potential is calculated in accordance with molecular modeling B3LYP/6-31G(d) in combination with Koopman's Theorem (IP=$-\varepsilon_{HOMO}$).

13. A radiation curable composition for coating an optical fiber comprising:
a urethane acrylate oligomer which is the reaction product of an isocyanate, a polyol, and a (meth)acrylate monomer;
a reactive diluent monomer;
optionally, one or more additives; and
a Norrish Type I photoinitiator; wherein the Norrish Type I photoinitiator possesses:
(a) a potential excited triplet state with an ionization potential from 3.0 electron volts (eV) to 3.90 eV, wherein the ionization potential is calculated in accordance with molecular modeling B3LYP/6-31G (d) in combination with Koopman's Theorem (IP=$-\varepsilon_{HOMO}$); and/or
(b) a normalized rate of polymerization at 150 degrees Celsius (° C.) of between 0.35 and 0.9, wherein the normalized rate of polymerization at 150° C. is the maximum polymerization rate (in mmol/kg sec) of a mixture at 150° C. divided by the maximum polymerization rate of the mixture at 25° C., wherein the mixture comprises 1 part by weight of the Norrish Type I photoinitiator and 99 parts by weight of ethoxylated nonyl-phenol acrylate, and the polymerization rate is determined via an RT-FTIR method, wherein the RT-FTIR method is conducted while employing an ATR crystal with a 60 micron film, and a Dr. Honle D-bulb with an irradiance of 20 mW/cm².

14. The composition according to claim 13, wherein the radiation curable composition is substantially free from a pigment.

15. The composition according to claim 13, wherein the composition is substantially free from an acyl phosphine oxide photoinitiator.

16. The composition according to claim 13, wherein the composition is a primary coating composition further comprising an adhesion promoter, and wherein, relative to the weight of the entire composition:
the urethane acrylate oligomer is present from 40 wt. % to 90 wt. %;
the reactive diluent monomer is present from 5 wt. % to 60 wt. %;
the additives are present from 0 wt. % to 40 wt. %; and
the Norrish Type I photoinitiator is present from 0.005 wt. % to 5 wt. %.

17. The composition according to claim 16, wherein the composition is a secondary coating composition and wherein, relative to the weight of the entire composition:
the urethane acrylate oligomer is present from 10 wt. % to 85 wt. %;
the reactive diluent monomer further comprises
a monofunctional ethylenically unsaturated compound which is present from 0 wt. % to 20 wt. %, and
a multifunctional ethylenically unsaturated compound which is present from 10 wt. % to 75 wt. %;
the additives are present from 0 wt. % to 40 wt. %; and
the Norrish Type I photoinitiator is present from 0.005 wt. % to 5 wt. %.

18. The composition according to claim 16, wherein the urethane acrylate oligomer possesses an average from 0.8 to 2.2 polymerizable groups, and wherein the polyol comprises polypropylene glycol.

19. The composition according to claim 13, wherein the Norrish Type I photoinitiator comprises an acylgermanium compound possessing a structure in accordance with the following formula (I):

in which $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups;
further wherein one of the following conditions is satisfied:
(a) each of $R_1$-$R_3$ is an aryl-substituted or aromatic acyl group; or
(b) if exactly two of $R_1$-$R_3$ are an aryl-substituted or aromatic acyl group, the remaining substituted groups are a $C_1$-$C_{10}$ alkyl; or
(c) if exactly one of $R_1$-$R_3$ is an aryl-substituted or aromatic acyl group, the remaining two substituted groups are a $C_1$-$C_{10}$ alkyl; or
(d) each of $R_1$-$R_3$ is a $C_1$-$C_{10}$ alkyl.